United States Patent
Jones et al.

(10) Patent No.: US 8,523,965 B2
(45) Date of Patent: Sep. 3, 2013

(54) TREATING WASTE STREAMS WITH ORGANIC CONTENT

(71) Applicants: Coyte R Jones, Lancaster, CA (US); Robert C Jones, Lancaster, CA (US)

(72) Inventors: Coyte R Jones, Lancaster, CA (US); Robert C Jones, Lancaster, CA (US)

(73) Assignee: Doulos Technologies LLC, Lancaster, CA (US)

( * ) Notice: Subject to any disclaimer, the term of this patent is extended or adjusted under 35 U.S.C. 154(b) by 0 days.

(21) Appl. No.: 13/761,140

(22) Filed: Feb. 6, 2013

(65) Prior Publication Data

US 2013/0199918 A1    Aug. 8, 2013

Related U.S. Application Data

(60) Provisional application No. 61/596,207, filed on Feb. 7, 2012.

(51) Int. Cl.
*C02F 1/00*    (2006.01)

(52) U.S. Cl.
USPC .............. 48/204; 48/102 R; 48/127.9; 203/47; 203/87; 203/99; 210/705; 210/713; 210/748.01

(58) Field of Classification Search
USPC ................ 48/102 R, 127.9, 204; 201/23, 35; 203/23, 35, 99, 87; 210/705, 713, 748.01
See application file for complete search history.

(56) References Cited

U.S. PATENT DOCUMENTS

| | | | |
|---|---|---|---|
| 3,969,245 A | 7/1976 | Ramirez | |
| 4,350,103 A | 9/1982 | Poll | |
| 4,379,045 A | 4/1983 | Audeh | |
| 4,415,432 A | 11/1983 | York | |
| 4,622,210 A | 11/1986 | Hirschberg | |
| 4,969,932 A | 11/1990 | Potter | |
| 4,969,933 A | 11/1990 | Hsu | |
| 5,443,716 A | 8/1995 | Anderson | |
| 5,501,798 A | 3/1996 | Al-Samadi | |
| 5,711,768 A | 1/1998 | Schulz | |
| 6,016,868 A | 1/2000 | Gregoli | |
| 6,746,593 B2 | 6/2004 | Herbst | |
| 6,960,301 B2 | 11/2005 | Bradley | |
| 7,455,773 B1 | 11/2008 | Harmon | |
| 7,731,854 B1 * | 6/2010 | Herbst | 210/651 |
| 7,811,340 B2 | 10/2010 | Bayle | |
| 2005/0115478 A1 | 6/2005 | Pope | |
| 2007/0017874 A1 * | 1/2007 | Renaud et al. | 210/703 |
| 2007/0199868 A1 | 8/2007 | Volpe | |
| 2009/0107915 A1 | 4/2009 | Skinner | |
| 2009/0166296 A1 | 7/2009 | Tigani | |

(Continued)

OTHER PUBLICATIONS

Houghton, Jeff, "Mr. Clean", 417 Magazine, 2011-01, http://www.417mag.com/417-Magazine/January-2011/Mr-Clean/.

(Continued)

*Primary Examiner* — Nina Bhat
(74) *Attorney, Agent, or Firm* — Pui Tong Ho

(57) ABSTRACT

Methods, systems and devices for treating and remediating or abating carbon containing wastes to produce clean water, non-toxic, non-hazardous ash has been taught and described, the method, systems and devices are particularly suited to treating aqueous hydrocarbon containing waste streams generated in the oil and gas drilling and hydrofracking industry including electrocoagulating which removes flocculent, the flocculent is removed and then the aqueous stream is separated into light fractions and heavy fractions. The heavy fraction and flocculent are recombined and then gasified to produce syngas and ash, the syngas can then be used in generating power.

20 Claims, 5 Drawing Sheets

(56) References Cited

U.S. PATENT DOCUMENTS

| | | |
|---|---|---|
| 2009/0217575 A1 | 9/2009 | Raman |
| 2010/0038310 A1 | 2/2010 | Shafer |
| 2010/0042557 A1 | 2/2010 | Block |
| 2010/0126926 A1 | 5/2010 | Wiemers |
| 2010/0314263 A1 | 12/2010 | Lean |
| 2011/0003676 A1 | 1/2011 | Collier |
| 2011/0039318 A1 * | 2/2011 | Lehr ........................... 435/161 |
| 2011/0192730 A1 | 8/2011 | Bjornen |

OTHER PUBLICATIONS

International Search Report, Written Opinion, and Search History for International Application No. PCT/US2013/025001, Apr. 8, 2013.

* cited by examiner

TREATING WASTE STREAMS WITH ORGANIC CONTENT

BACKGROUND

1. Technical Field

This disclosure relates to devices, systems, and processes suitable for treating waste streams containing organic compounds, and more particularly, for treating waste streams containing hydrocarbons.

2. Description of the Related Art

Disposing of hydrocarbon-containing waste streams often poses costly problems for various industries. For example, disposing of waste generated from drilling oil wells is not only increasingly expensive, suitable disposal sites are also increasingly scarce. Hydraulic fracturing, hydrofracturing, or fracking, a method used in oil and gas drilling, uses high pressure water in combination with sand and chemicals to break apart underground rock formations, thereby releasing oil and/or gas trapped therein. Hydraulic fracturing typically generates large volumes of waste requiring disposal or remediation. In some instances, hydraulic fracturing generates thousands or even millions of liters of waste per day per well. The cost of environmentally responsible disposal of large amounts of waste makes oil or gas production unfeasible in some locations.

SUMMARY

Embodiments of systems, devices, and methods for treating, remediating, or abating carbon-containing wastes generate at least one of clean water; non-toxic, non-hazardous ash; or power. Some embodiments are modular, permitting rapid deployment, flexible configuration, and easy transportation. Embodiments of the systems treat aqueous waste, carbon-containing waste, or a combination thereof. The systems, devices, and methods are particularly suited to treating hydrocarbon-containing waste generated in oil and natural gas drilling, for example, in hydro fracturing.

Some embodiments provide a method for remediating a carbon-containing aqueous waste, the method comprising: electrocoagulating the carbon-containing aqueous waste to provide floc and a liquid phase; removing the floc from the liquid phase; physically separating the liquid phase into a light fraction and a heavy fraction; converting at least a portion of the light fraction into water with a selected purity; mixing at least one of the floc and the heavy fraction with a carbon-based material to provide a mixture; gasifying the mixture to provide ash and syngas.

Some embodiments provide a method for remediating a carbon-containing waste, the method comprising: contacting carbon-containing waste with a carbon-based material to provide a mixture; gasifying the mixture into ash and syngas; and generating power from the syngas.

Some embodiments provide a method for remediating a carbon-containing aqueous waste, the method comprising: electrocoagulating the carbon-containing aqueous waste to provide floc and a liquid phase; removing the floc from the liquid phase; physically separating the liquid phase into a light fraction and a heavy fraction; and converting at least a portion of the light fraction into remediated water.

In some embodiments, electrocoagulating the carbon-containing aqueous waste comprises electrocoagulating wastewater from oil or natural gas drilling, or from hydrofracturing. In some embodiments, electrocoagulating the carbon-containing aqueous waste comprises adjusting a pH of the carbon-containing aqueous waste.

In some embodiments, removing the floc from the liquid phase comprises allowing at least a portion of the floc to at least one of precipitate towards a bottom of or float towards a top of the liquid phase. In some embodiments, removing the floc from the liquid phase comprises adding a flocculating agent. In some embodiments, removing the floc from the liquid phase comprises at least one of draining or skimming the floc from the liquid phase. In some embodiments, removing the floc from the liquid phase comprises dissolved air flotation of the floc.

In some embodiments, physically separating the liquid phase comprises physically separating the liquid phase by at least one of weight or density. In some embodiments, physically separating the liquid phase comprises physically separating the liquid phase into a first light fraction and a first heavy fraction, and further comprises physically separating the first heavy fraction into a second light fraction and a second heavy fraction.

In some embodiments, converting at least a portion of the light fraction comprises at least one of filtration, activated carbon filtration, charcoal filtration, sand filtration, diatomaceous earth filtration, membrane filtration, microfiltration, ultrafiltration, nanofiltration, reverse osmosis, distillation, or vapor compression distillation, UV irradiation, gamma irradiation, sterilization, chlorination, ozonation, electrodeionization, or ion exchange. In some embodiments, converting at least a portion of the light fraction comprises microfiltration and reverse osmosis. In some embodiments, converting at least a portion of the light fraction comprises vapor compression distillation. In some embodiments, converting at least a portion of the light fraction comprises generating a concentrate or residue comprising contaminants and/or impurities.

Some embodiments further comprise mixing the concentrate or residue with the carbon-based material to provide the mixture.

In some embodiments, mixing at least one of the floc and the heavy fraction with a carbon-based material to provide a mixture comprises heating the mixture. In some embodiments, mixing at least one of the floc and the heavy fraction with a carbon-based material to provide a mixture comprises mixing a carbon-containing waste with the carbon-based material. In some embodiments, mixing at least one of the floc and the heavy fraction with a carbon-based material comprises mixing at least one of the floc and the heavy fraction with at least one of kenaf, kenaf bast, or kenaf core. In some embodiments, mixing at least one of the floc and the heavy fraction with a carbon-based material comprises mixing at least one of the floc and the heavy fraction with the carbon-based material to provide a mixture with a heat value greater than about 1,000 kJ/kg.

In some embodiments, gasifying the mixture comprises at least one of thermal gasification, pyrolytic gasification, plasma gasification, plasma-enhanced gasification, or molten-salt gasification. In some embodiments, gasifying the mixture comprises gasifying the mixture at from about 200° C. to about 10,000° C. In some embodiments, gasifying the mixture comprises gasifying the mixture in the presence of limited oxygen. In some embodiments, gasifying the mixture in the presence of limited oxygen comprises adjusting an amount of oxygen based on a composition of the syngas. In some embodiments, gasifying the mixture in the presence of limited oxygen comprises adjusting an amount of oxygen based on a composition of the mixture. In some embodiments, gasifying the mixture to provide ash comprises gasifying the mixture to provide a vitreous, non-toxic ash.

Some embodiments further comprise generating power from the syngas.

Some embodiments further comprise collecting volatile organic compounds in at least one process step. Some embodiments further comprise generating power from the volatile organic compounds. Some embodiments further comprise screening solids from the carbon-containing aqueous waste. Some embodiments further comprise removing substantially all ferromagnetic debris with a diameter greater than about 3 mm. Some embodiments further comprise compacting the mixture into briquettes or pellets before gasifying the mixture.

In some embodiments, contacting carbon-containing waste with a carbon-based material comprises contacting carbon-containing waste with a carbon-based material in a mixer unit. In some embodiments, contacting carbon-containing waste with a carbon-based material to provide a mixture comprises heating the mixture. In some embodiments, contacting carbon-containing waste with a carbon-based material to provide a mixture comprises contacting carbon-containing waste with at least one of kenaf, kenaf bast, or kenaf core. In some embodiments, contacting carbon-containing waste with a carbon-based material to provide a mixture comprises contacting carbon-containing waste with a carbon-based material to provide a mixture with a heat value greater than about 1,000 kJ/kg.

In some embodiments, contacting carbon-containing waste with a carbon-based material comprises contacting waste comprising substantially hydrocarbons with the carbon-based material. In some embodiments, contacting waste comprising substantially hydrocarbons comprises contacting at least one of petroleum, crude oil, or a refined petroleum. In some embodiments, contacting carbon-containing waste with a carbon-based material comprises contacting carbon-containing waste with the carbon-based material at least partially on a body of water.

In some embodiments, remediating the carbon-containing aqueous waste is a continuous process.

In some embodiments, remediating the carbon-containing waste is a continuous process.

Some embodiments provide a system for remediating an aqueous waste and a carbon-containing waste, the system comprising: a screening unit comprising a carbon-containing aqueous waste inlet, a screened solids outlet, and a liquid outlet; a pH adjustment unit comprising an inlet fluidly coupled to the liquid outlet of the screening unit, the pH and flocculating agent adjustment unit suitable for automatically adjusting a pH of an aqueous waste stream; an electrocoagulation unit comprising an inlet fluidly coupled to the outlet of the pH adjustment unit and an outlet; a storage unit comprising an inlet fluidly coupled to the outlet of the electrocoagulation unit and an outlet, the storage unit suitable for separating floc from an aqueous waste; a physical separation unit comprising an inlet fluidly coupled to the outlet of the electrocoagulation unit, the physical separation comprising a centrifuge capable of separating fluid into a heavy fraction and a light fraction, the physical separation unit comprising a heavy fraction outlet and a light fraction outlet; a purification unit comprising an inlet fluidly coupled to the light fraction outlet of the physical separation unit, the purification unit comprising at least one of a vapor compression distillation unit or a membrane filter, the purification unit capable of converting at least a portion of the light fraction into water of a selected purity; a mixer unit comprising at least one inlet and a mixture outlet, the at least one inlet fluidly coupled to the heavy fraction outlet of the physical separation unit, the at least one inlet coupled to a source of the carbon-containing waste, and the at least one inlet coupled to a source of at least one of kenaf, kenaf bast, or kenaf core, the mixer unit comprising a continuous mixer including a heater, wherein the continuous mixer is a paddle mixer, a ribbon mixer, or a combination paddle-ribbon mixer; a briquetter comprising an inlet coupled to the mixture outlet of the mixer unit and a briquette outlet, the briquetter capable of compressing the output of the mixer unit into briquettes; a gasification unit comprising an inlet coupled to the briquette outlet of the briquetter, the gasification unit further comprising a syngas outlet; and a generator comprising an inlet fluidly coupled to the syngas outlet of the gasification unit and an electrical outlet, the generator comprising an internal combustion engine capable of running on at least syngas.

Some embodiments provide a system for remediating a carbon-containing aqueous waste, the system comprising: an electrocoagulation unit comprising an aqueous waste inlet and an outlet; a physical separation unit comprising an inlet fluidly coupled to the outlet of the electrocoagulation unit, the physical separation unit capable of separating fluid into a heavy fraction and a light fraction based on at least one of size, weight, or density, the physical separation unit comprising a heavy fraction outlet and a light fraction outlet; a purification unit comprising an inlet fluidly coupled to the light fraction outlet of the physical separation unit, the purification unit capable of converting at least a portion of the light fraction into water of a selected purity; a mixer unit comprising a waste inlet, a carbon-based material inlet, and a mixture outlet, the waste inlet fluidly coupled to the heavy fraction outlet of the physical separation unit and the carbon-based material inlet coupled to a source of a carbon-based material; and a gasification unit comprising an inlet coupled to the mixture outlet of the mixer unit, the gasification unit further comprising a syngas outlet.

Some embodiments provide a system for remediating carbon-containing waste, the system comprising: a mixer unit comprising a waste inlet, a carbon-based material inlet, and a mixture outlet, the waste inlet fluidly coupled to the heavy fraction outlet of the physical separation unit and the carbon-based material inlet coupled to a source of a carbon-based material; a gasification unit comprising an inlet coupled to the mixture outlet of the mixer unit, the gasification unit further comprising a syngas outlet; and a system generator comprising a fuel inlet fluidly coupled to the syngas outlet of the gasification unit, and an electrical power outlet electrically coupled to electrical power inlets on at least one of the mixer unit or the gasification unit.

Some embodiments provide a system for remediating carbon-containing aqueous waste, the system comprising: an electrocoagulation unit comprising an aqueous waste inlet and an outlet; a physical separation unit comprising an inlet fluidly coupled to the outlet of the electrocoagulation unit, the physical separation unit capable of separating fluid into a heavy fraction and a light fraction based on at least one of size, weight, or density, the physical separation unit comprising a heavy fraction outlet and a light fraction outlet; and a purification unit comprising an inlet fluidly coupled to the light fraction outlet of the physical separation unit, the purification unit capable of converting at least a portion of the light fraction into water of a selected purity.

In some embodiments, the electrocoagulation unit is equipped for dissolved air flotation.

In some embodiments, the physical separation unit comprises at least one of a vortex separator, horizontal vortex separator, vertical vortex separator, hydrocyclone, centrifuge, or decanter centrifuge. In some embodiments, the physical separation unit comprises a first physical separation subunit comprising an inlet fluidly coupled to the outlet of the electrocoagulation unit, a light fraction outlet, and a heavy fraction outlet, and a second physical separation subunit comprising an inlet fluidly connected to the heavy fraction outlet of the first physical separation subunit, a light fraction outlet, and a heavy fraction outlet. In some embodiments, the physical separation unit comprises at least one of a liquid-liquid separator, a liquid-solid separator, a liquid-liquid-liquid separator, or a liquid-liquid-solid separator.

In some embodiments, the purification unit comprises at least one of a filtration unit, charcoal or activated carbon filter, sand filter, diatomaceous earth filter, membrane filter, microfiltration unit, ultrafiltration unit, nanofiltration unit, reverse osmosis (RO) system, distillation system, vapor compression distillation unit, UV irradiator, gamma irradiator, sterilizer, chlorinator, ozone generator, electrodeionizer, or ion exchanger. In some embodiments, the purification unit comprises a charcoal or activated carbon filter and at least one membrane filter. In some embodiments, the at least one membrane filter comprises a reverse osmosis unit. In some embodiments, the purification unit comprises a charcoal or activated carbon filter and at least one vapor compression distillation unit.

In some embodiments, the mixer unit comprises at least one of a paddle mixer, ribbon mixture, paddle/ribbon mixer, plow mixer, screw mixer, V mixer, or high-shear mixer. In some embodiments, the mixer unit comprises a heating element. In some embodiments, the mixer unit comprises at least one of an electromagnet or a permanent magnet.

In some embodiments, the gasification unit comprises at least one of a thermal gasifier, a pyrolytic gasifier, a plasma-enhanced gasifier, a plasma gasifier, or a molten-salt gasifier. In some embodiments, the gasification unit is operable from about 200° C. to about 10,000° C.

Some embodiments further comprise a screening unit upstream of the electrocoagulation unit, the screening unit comprising a waste inlet and a waste outlet, the waste outlet fluidly coupled to the aqueous waste inlet of the electrocoagulation unit, the screening unit capable of removing at least a portion of at least one of sand, gravel, sediment, aggregate, particles, or solids above a selected size. Some embodiments further comprise an in-line pH adjustment unit suitable for adjusting a pH at least one of upstream of the electrocoagulation unit, within the electrocoagulation unit, or downstream of the electrocoagulation unit.

Some embodiments further comprise a storage unit fluidly disposed between the electrocoagulation unit and the physical separation unit, the storage unit permitting floc formation from electrocoagulated liquid. In some embodiments, the storage unit comprises a mechanical separation device capable of separating floc from liquid. In some embodiments, the mechanical separation device comprises at least one of a skimmer or a drain. In some embodiments, the storage unit is equipped for dissolved air flotation.

Some embodiments further comprise a compactor disposed between the mixer unit and the gasification unit, the compactor capable of compacting the mixture generated by the mixer unit.

Some embodiments further comprise a system generator comprising a fuel inlet fluidly coupled to the syngas outlet of the gasification unit, and an electrical power outlet electrically coupled to electrical power inlets on at least one of the electrocoagulation unit, the physical separation unit, the purification unit, the mixer unit, or the gasification unit. In some embodiments, the system generator comprises at least one of a gas turbine, internal-combustion-engine-powered generator, external-combustion-engine-powered generator, or a fuel cell.

Some embodiments further comprise a volatile organic compound collection system.

In some embodiments, at least a portion of the system is modularized. In some embodiments, the electrocoagulation unit, the physical separation unit, the purification unit, the mixer unit, and the gasification unit are disposed in at least one intermodal shipping container or semi trailer.

DETAILED DESCRIPTION OF CERTAIN EMBODIMENTS

Figure 1:
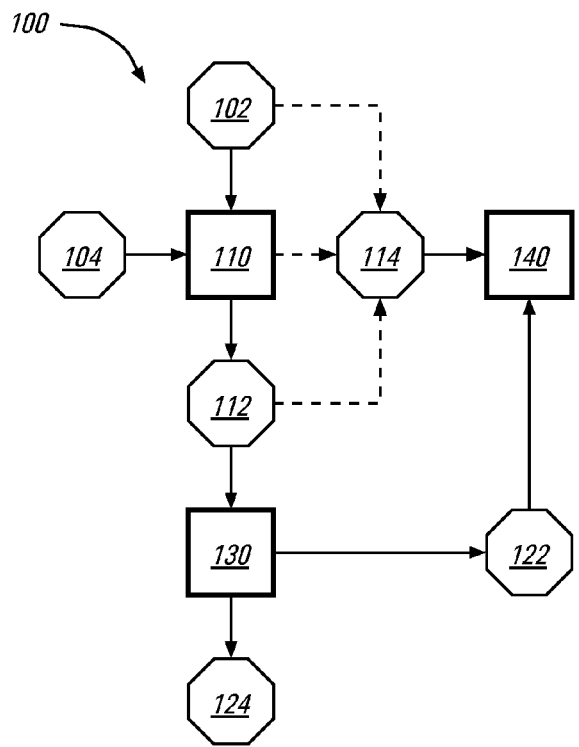
FIG. 1 schematically illustrates an embodiment of a carbon-containing waste abatement system.

Disclosed herein are embodiments of a waste stream remediation or abatement devices, methods, and systems designed for remediating solid or aqueous waste streams containing organic contaminants, for example, hydrocarbons. Such waste streams are generated in oil and gas production, as well as in other industries, for example, paper and pulp manufacturing, chemical production, pharmaceutical manufacturing, petroleum refining, plastic and polymer manufacturing, tanneries, fabric dye works, agriculture, breweries, distilleries, rendering plants, electronics manufacturing, explosives manufacturing, and military and military contractor operations. Embodiments of devices, methods, and systems are described with reference to remediating hydrocarbon-containing waste streams, for example, from oil or gas drilling operations. In some embodiments, the solid and/or liquid waste is waste generated by hydrofracturing or fracking in oil or natural gas exploration or production. The disclosed devices, methods, and systems are not is not limited thereto, however, and are suitable for treating any suitable waste stream containing one or more organic components, as well as one or more inorganic components, and optionally, an aqueous component. In some embodiments, the devices, methods, and systems substantially completely remediate or abate an input waste stream containing an organic component by converting the input waste and/or waste stream into one or more outputs comprising, for example, a non-hazardous reusable ash, syngas comprising hydrogen and/or carbon monoxide, and/or water suitable for re-use or discharge without further treatment. Some embodiments include detailed descriptions of one or more components, sub-components, methods, and/or options that are equally applicable to other embodiments, as would be understood by the skilled person. Similar elements have similar reference characters.

FIG. 1 schematically illustrates an embodiment of a system 100 for treating, remediating, or abating carbon-containing waste and/or waste containing organic compounds 102. In the illustrated embodiment, the system 100 comprises a mixer unit 110 coupled with a gasification unit 130, which is coupled to a system generator 140. In an embodiment of treating carbon-containing waste 102 using the abatement system 100 illustrated in FIG. 1, carbon-containing waste 102 is optionally combined with a carbon-based material 104 in the mixer unit 110, forming a mixture 112. The mixture 112 is fed into the gasification unit 130 where the mixture 112 is converted into syngas 122 and ash 124. In the illustrated embodiment, the syngas 122 fuels the system generator 140, which powers the abatement system 100, and also generates excess power in some embodiments. Optionally, volatile organic compounds 114 outgassed from any combination of the carbon-containing waste 102, mixer unit 110, carbon-based material 104, or mixture 112 are collected, as indicated by the dotted lines in FIG. 1. In the illustrated embodiment, the volatile organic compounds 114 also fuel the generator 140. In other embodiments, the volatile organic compounds 114 are used for another purpose, for example, recycled and/or used as a raw material for higher value products.

The carbon-containing waste 102 is any suitable carbon-containing feedstock, for example, a hydrocarbon containing solid waste generated by oil and natural gas well drilling known in the industry as "cuttings", hydrocarbon containing solids resulting from oil spill clean-up, residue from waste water treatment, industrial waste, agricultural waste, another substantially solid feedstock containing organic material, or any combination thereof. Some embodiments of the carbon-containing waste 102 are substantially solid. Some embodiments of the carbon-containing waste 102 are largely solid, but include a semisolid component, tar, sludge, and/or liquid component. Some embodiments of the carbon-containing waste 102 are substantially at least one of liquid, semisolid, or sludge. Some embodiments of the carbon-containing waste comprise hydrocarbons, for example, crude oil, petroleum, and/or refined petroleum products, including gasoline, diesel, kerosene, jet fuel, bunker fuel, white gas, and/or fuel oil. In some embodiments, the hydrocarbons are solid, liquid, and/or gas under ambient conditions. Some embodiments of the carbon-containing waste 102 comprise a low boiling or volatile component, for example, low molecular weight organic compounds, including hydrocarbons, alkanes, alkenes, alcohols, ketones, aldehydes, esters, terpenes, and the like. In some embodiments, the carbon-containing waste 102 is aqueous waste comprising at least one of organic contaminants or inorganic contaminants, for example, oil, hydrocarbons, salts, minerals, or the like. In some embodiments, the carbon-containing waste 102 comprises water. As discussed below, in some embodiments, carbon-containing aqueous waste 102, particularly more dilute carbon-containing aqueous waste, is treated or remediated using a different method, system, and/or apparatus. In some embodiments, the carbon-containing waste 102 comprises at least one of aggregate, particulates, clays, minerals, absorbents (e.g., used for absorbing spills), or disposable petroleum booms (e.g., comprising kenaf). Carbon-containing waste 102 is also referred to as solid waste, non-aqueous waste, bulk waste, organic waste, and concentrated waste.

In the embodiment illustrated in FIG. 1, the carbon-containing waste 102 is supplemented with a sufficient quantity of the carbon-based material 104. In some embodiments, the carbon-based material 104 in combination with the carbon-containing waste 102 provide a mixture 112 with a desired heat value or caloric content. In some embodiments, the carbon-based material 104 has another function, for example, to absorb liquid, to provide desired flow characteristics, and/or to adjust the average stoichiometry of the mixture. In other embodiments, the carbon-containing waste 102 has the desired characteristics, for example, a sufficient heat value, and is not combined with a carbon-based material. In those embodiments, references to the mixture 112 in the following discussion are understood to refer to the waste 102.

In some embodiments, the heat value of the mixture 112 is greater than about 1,000 kJ/kg (about 2,000 BTU/lb), greater than about 2,000 kJ/kg (about 4,000 BTU/lb), greater than about 2,500 kJ/kg (about 5,000 BTU/lb), greater than about 3,000 kJ/kg (about 6,000 BTU/lb), greater than about 3,250 kJ/kg (about 6,500 BTU/lb), greater than about 3,500 kJ/kg (7,000 BTU/lb), or within a range from about 1,000 kJ/kg (about 2,000 BTU/lb) to about 10,000 kJ/kg (about 20,000 BTU/lb), including from about 1,000 kJ/kg (about 2,000 BTU/lb) to about 7,500 kJ/kg (about 15,000 BTU/lb), including from about 1,000 kJ/kg (about 2,000 BTU/lb) to about 10,000 BTU, including from about 2,000 kJ/kg (about 4,000 BTU/lb) to about 7,500 kJ/kg (about 15,000 BTU/lb), including from about 2,500 kJ/kg (about 5,000 BTU/lb) to about 5,000 kJ/kg (about 10,000 BTU/lb), including from about 3,000 kJ/kg (about 6,000 BTU/b) to about 4,500 kJ/kg (about 9,000 BTU/lb), including from about 3,500 kJ/kg (about 7,000 BTU/lb) to about 4,250 kJ/kg (about 8,500 BTU/lb), including about 2,750 kJ/kg (about 5,500 BTU/lb), about 3,250 kJ/kg (about 6,500 BTU/lb), about 3,500 kJ/kg (about 7,000 BTU/lb), about 3,750 kJ/kg (about 7,500 BTU/lb), about 4,000 kJ/kg (about 8,000 BTU/lb), about 4,250 kJ/kg (about 8,500 BTU/lb), about 4,500 kJ/kg (about 9,000 BTU/lb), and including ranges bordered by and including the foregoing values.

Some embodiments of the carbon-based materials 104 suitable for combining with the carbon-containing waste 102 comprise at least one material capable of increasing the heat value of the solid waste stream 102. Some embodiments of the carbon-based material 104 comprise cellulosic material. In some embodiments, the carbon based material stream 104 comprises at least one of tires, jute, wood, wood waste, hay, paper, bitumen, lignite, coal, or agricultural residues including but not limited to bagasse, corn stalks, corn cobs, wheat straw, straw, coconut shells, coconut husks, bamboo, and/or rice husks. Some embodiments of the carbon-based material comprise at least one of milkweed floss, peat moss, cotton, or cotton stalks. In some embodiments, the carbon-based material 104 comprises at least one of kenaf, kenaf bast, or kenaf core. Kenaf core or bast has a heat value of about 3,750 kJ/kg (about 7,500 BTU/lb). Kenaf core is also readily available and inexpensive. As used herein, the term "kenaf" includes any combination of kenaf, kenaf bast, and kenaf core unless another meaning is expressly or implicitly stated. In some embodiments, the kenaf is pelletized or compressed, for example, for ease of transport and/or storage. In some embodiments, the pelletized or compressed kenaf breaks apart in the mixer unit 110, thereby increasing the exposed surface area thereof, thus facilitating absorption of liquid and/or vapor, for example, hydrophobic liquid or gas, organic compounds, and/or hydrocarbons, therein. In some embodiments, the pelletized or compressed kenaf is at least partially broken-up or otherwise uncompressed before it is added to the mixer unit 110.

The quantity of the carbon-based material 104 added to the carbon-containing waste 102 depends on factors including one or more of the composition of the carbon-containing waste 102, the composition of the carbon-based material 104, a desired heat value of the mixture 112, and a desired consistency and/or texture of the mixture 112. For example, in some embodiments, the carbon-containing waste 102 is a liquid, is sticky and/or a sludge, and a sufficient amount of a suitable carbon-containing material is added to provide a free-flowing mixture 112. In some embodiments, a waste 102 with a low heat value, for example, containing a high proportion of inorganic material, for example, clay and/or rock, is combined with a sufficient amount of the carbon-based material 104 to yield a mixture 112 with a desired heat value. Some embodiments of the weight percentage of the carbon-based material 104 in the mixture 112 ranges from about 1% to about 95%, including from about 2% to about 90%, including from about 10% to about 90%, including from about 20% to about 80%, including from about 20% to about 70%, including from about 30% to about 70%, including from about 30% to about 60%, including from about 30% to about 50%, including from about 35% to about 55%, including about 30%, including about 35%, including about 40%, including about 45%, including about 50%, including about 55%, and including ranges bordered by and including the foregoing values. In some embodiments where an added carbon-based material 104 is kenaf, the kenaf comprises from about 20% to about 70% by weight of the mixture 112, including from about 30% to about 70%, including from about 40% to about 70%, including from about 35% to about 60%, including from about 40% to about 60%, including from about 45% to about 60%, including from about 45% to about 70%, including from about 50% to about 70%, including about 30%, about 35%, about 40%, about 45%, about 50%, about 55%, about 60%, about 65%, about 70%, and including ranges bordered by and including the foregoing values.

In the illustrated embodiment, the carbon-containing waste 102 is combined or contacted with the carbon-based material 104 in the mixer unit 110, which in turn outputs the mixture 112. In some embodiments, the mixer unit 110 is a continuous mixer, accepting at least two solid input streams, or at least one solid input stream and at least one liquid stream. In other embodiments, the mixer unit 110 is a batch mixer. The mixer unit 110 comprises any suitable type of mixer, for example, paddle mixers, ribbon mixtures, paddle/ribbon mixers, plow mixers, screw mixers, V mixers, high-shear mixers, and the like. Examples of suitable commercially available mixers include TENDER BLENDER™ continuous mixer (Scott Equipment, New Prague, Minn.), ARAN™ continuous mixing plant (Gears Inc., Crested Butte, Colo.), and industrial mixers sold by Astec Industries (Chattanooga, Tenn.) and Fabromatic Industries (Ahmedabad, Gujarat, India).

In some embodiments, the carbon-containing waste 102 is contacted with at least a portion of the carbon-based material 104 outside of the mixer unit 110. For example, in some embodiments, kenaf is contacted with oil and/or hydrocarbon waste generated, for example, by processes including, but not limited to, oil well drilling, hydraulic fracturing of underground rock formations in oil or gas drilling, oil clean-up both on land and on water, and/or other processes. The porous bast fiber or core material of kenaf absorbs oil and other hydrocarbons. Kenaf also has naturally hydrophobic properties due to its surface waxes. Materials having surfaces covered by wax or wax-like compounds attract oil and other hydrocarbons while repelling water, and consequently, are suited for absorbing oil or other hydrocarbons spread over bodies of water. Additionally, kenaf is less dense than water (about 0.128 g/mL or about 8 lb/ft$^3$), and consequently, floats in water along with any spilled oil and/or other hydrocarbon. As discussed in U.S. Pat. No. 7,655,149, the disclosure of which is incorporated herein, kenaf spreads over a surface of a body of water, allowing the kenaf to absorb any oil and/or other hydrocarbons floating thereon, while absorbing very little water. Moreover, kenaf floats for a long time, thereby facilitating its recovery. Kenaf's affinity for oil and other hydrocarbons makes kenaf an ideal sorbent for oil, other hydrocarbons, and/or other hydrophobic materials in other contexts as well, for example, spills on solid surfaces such as on land, or other hard surfaces. In some embodiments, the resulting oil- and/or hydrocarbon-soaked kenaf is the mixture 112 fed directly into the gasification unit 130, while in other embodiments, the oil- and/or hydrocarbon-soaked kenaf is combined with additional carbon-based material 104 in the mixer unit 110.

Some embodiments of the mixer unit 110 comprise a heating element, which permits heating the contents to a desired temperature. Mixing at a low temperature, for example, in a cold climate, is less efficient in some embodiments. Consequently, in some embodiments, the contents of the mixer unit 110 are heated to a temperature within a range of from about 5° C. to about 100° C., including from about 5° C. to about 90° C., including from about 10° C. to about 80° C., including from about 10° C. to about 75° C., including from about 10° C. to about 50° C., including from about 10° C. to about 30° C., including from about 10° C. to about 25° C., including from about 15° C. to about 30° C., including from about 17° C. to about 22° C., including about 17° C., including about 18° C., including about 19° C., including about 20° C., including about 21° C., including about 22° C., including about 23° C., including about 24° C., including about 25° C., and including ranges bordered by and including the foregoing values. In some embodiments, the heating element also dries the mixture 112 to a desired water content. In some embodiments, the desired water content of the mixture 112 will depend on factors including the composition of the mixture 112 and the characteristics of the gasification unit 130.

In some embodiments, the heating element comprises at least one of an electrical heating element, for example, a resistive heating element; a steam heating element; a heated-fluid heating element, for example, hot air, heated gas, hot water, hot oil, or another heat transfer fluid; or a radiant energy heating element, for example, infrared and/or microwave radiation. In some embodiments, the heating element comprises a heating jacket that surrounds at least a portion of the mixer unit 110. In some embodiments, one or more portions of the heating element extend into the mixing unit 110, for example, as pipes, fins, or the like. Some embodiments of the heating element use waste heat generated by the system generator 140 and/or gasification unit 130. In some embodiments, the heating element is at least partially powered by the system generator 140.

In some embodiments, at least one of the carbon-containing waste 102 or the carbon-based material 104 is preheated before entering the mixer unit 110, using, for example, the types of heating elements discussed above.

In some embodiments, volatile organic compounds 114 are released in the mixer unit 110 during mixing. In some embodiments, the volatile organic compounds 114 are removed from the mixer unit 110, for example, under vacuum, under reduced pressure, by purging with a stream of gas, and/or by condensation. In some embodiments, volatile organic compounds 114 also outgas from at least one of the carbon-containing waste 102, the carbon-based material 104, or the mixture 112. For example, in some embodiments, at least one of the carbon-containing waste 102, the carbon-based material 104, or the mixture 112 are contained within a bin, hopper, tank, duct, and/or pipe for at least some period of time, in storage and/or in transit, for example. In some of these embodiments, volatile organic compounds (VOCs) 114 are released into the bin, hopper, tank, duct, and/or pipe, and removed therefrom as discussed above in reference to removing volatile organic compounds 114 from the mixer unit 110. In the embodiment illustrated in FIG. 1, volatile organic compounds 114 from these sources are removed, as indicated by the dotted lines.

In the embodiment illustrated in FIG. 1, at least a portion of the volatile organic compounds 114 are used as fuel to power the system generator 140. In some embodiments, a portion of the volatile organic compounds 114 is fed into the gasification unit 130, for example, to increase the heat value of the feedstock thereof, to improve the generation of syngas, and/or as a fuel system enrichment. Consequently, some embodiments of the abatement system consume substantially all of the volatile organic compound 114 generated therefrom. In some embodiments, at least a portion of the volatile organic compounds 114 is collected, for example, for recycling, as a feedstock for another process, or as a valuable product in its own right.

Some embodiments of the abatement system 100 are equipped with a metal debris capture system that removes larger pieces of metal debris before the mixture 112 is fed into the gasification unit 130. In some embodiments, pieces of the drilling apparatus, for example, the drill head, drill pipe, and/or the casing, break off during oil and/or gas drilling, and the pieces are mixed with the cuttings. In some embodiments, the drill encounters metal in the ground, which is brought to the surface with the drilling debris, for example, with cuttings. Some embodiments of the gasification unit 130 do not efficiently process larger pieces of metal. Consequently, some embodiments of the abatement system 100 comprise at least one of a permanent magnet or electromagnet for removing ferrous debris. In some embodiments, the mixer unit 110 is equipped with one or more permanent magnets and/or electromagnets that capture ferrous and/or magnetic debris during mixing. Some embodiments comprise a magnetic capture system disposed between the mixer unit 110 and the gasification unit 130, and/or upstream of the mixer unit 110. In some embodiments, the magnetic capture system removes all ferromagnetic debris with a diameter greater than about 1 mm (about 0.04 in), greater than about 2 mm (about 0.08 in), greater than about 3 mm (about 0.125 in), or greater than about 5 mm (about 0.2 in).

Embodiments of the gasification unit 130 substantially completely convert the mixture 112 into syngas 122 and ash 124. As used herein, the term "syngas" refers to all of the gas phase components produced by the gasification unit 130, which typically include carbon monoxide, carbon dioxide, hydrogen, and water vapor. In some embodiments, the syngas also includes nitrogen. In the illustrated embodiment, the mixture 112 is partially oxidized at a high-temperature and low-oxygen regime. In some embodiments, oxygen is added, depending on the characteristics, for example, the oxygen content, hydrogen content, and/or average stoichiometry, of the mixture 112; and/or a desired syngas composition. In some embodiments, a measured syngas composition is compared with a desired syngas composition, and the amount of added oxygen is adjusted accordingly. In some embodiments, the oxygen source and syngas sensor are coupled in a feedback loop, thereby permitting the system 100 to maintain a desired syngas composition under changing conditions, for example, the composition of the carbon-containing waste 102, the carbon-based material 104, and/or water content of the mixture 112. Suitable oxygen sources include, for example, bottled oxygen, air, and/or oxygen generators.

Embodiments of the gasification unit 130 generate substantially no hazardous or toxic waste or emissions. Some embodiments of the gasification unit 130 substantially completely remediate the carbon-containing waste 102, converting the waste 102 an effluent comprising substantially of syngas 122 and ash 124. In some embodiments, the gasification unit 130 is operated to favor syngas 122 production. As discussed in greater detail below, in some embodiments, at least a portion of the syngas 122 fuels the system generator 140. In some embodiments, at least a portion of the syngas 122 is stored, for example, bottled; used as a feedstock; and/or flared.

The gasification unit 130 is any suitable type, comprising, for example, thermal gasifiers, plasma gasifiers, plasma-enhanced gasifiers, and molten-salt gasifiers. Commercially available examples of suitable gasification units include the PEPS® gasifier (Enersol Technologies Inc., Springfield, Va.); AESI™ Modular Biomass Gasification Boilers (AESI, Inc., Wichita, Kans.); BIOGEN™ MODEL 350 Gasifier Unit (Biogen, Miami, Fla.); BIOMASS CHP™ gasifiers (Biomass CHP, LTD, Larne, Northern Ireland); MARTEZO™ gas generator (Martezo Renewable Energy, Poitiers, France); POWERHEARTH™ gasifier (International Innovations Inc., Barre, Vt.), and COOL PLASMA™ Gasification (adaptiveARC, Inc., Oceanside, Calif.).

Some embodiments of gasification unit 130 operate a temperature within a range of from about 700° C. to about 10,000° C., including from about 700° C. to about 9,000° C., including from about 700° C. to about 8,000° C., including from about 700° C. to about 7,000° C., including from about 700° C. to about 6,000° C., including from about 700° C. to about 5,000° C., including from about 700° C. to about 4,000° C., including from about 700° C. to about 3,000° C., including from about 700° C. to about 2000° C., including from about 700° C. to about 1500° C., including from about 800° C. to about 2500° C., including from about 800° C. to about 2000° C., including from about 900° C. to about 2500° C., including from about 900° C. to about 2000° C., including from about 1000° C. to about 2500° C., including from about 1000° C. to about 2000° C., including from about 800° C. to about 1800° C., including from about 800° C. to about 1400° C., including from about 900° C. to about 1800° C., including from about 900° C. to about 1700° C., including from about 900° C. to about 1600° C., including from about 1000° C. to about 1800° C., including from about 1000° C. to about 1700° C., including from about 1000° C. to about 1600° C., including from about 1000° C. to about 1500° C., including from about 1000° C. to about 1300° C., including from about 1100° C. to about 1500° C., including from about 1100° C. to about 1400° C., including from about 1100° C. to about 1300° C., including about 1200° C., including about 1250° C., including about 1300° C., including about 1350° C., including about 1400° C., including about 1450° C., including about 1500° C., including about 1150° C., including about 1600° C., and including ranges bordered by and including the foregoing values.

Some embodiments of the gasification unit 130 operate at a lower temperature, for example, as low as about 200° C. Consequently, some embodiments of the gasifier operate above about 200° C., above about 250° C., above about 300° C., above about 350° C., above about 400° C., above about 450° C., above about 500° C., above about 550° C., above about 600° C., or above about 650° C.

Some embodiments of molten-salt gasifiers, also referred to as molten-salt-catalyzed gasifiers, are operable to generate hydrogen and carbon dioxide in addition to or instead of carbon monoxide and water vapor. Consequently, in some embodiments, the syngas 122 produced by the gasification unit 130 includes hydrogen and carbon dioxide, either alone or in admixture with carbon monoxide and water vapor. In some embodiments comprising a molten-salt gasifier, one or more salts are added to mixer unit 110 that produces the mixture 112 that is fed into the gasifier. In some embodiments, one or more salts are added to directly to the gasification unit 130, that is, separate from the mixture 112. Cations of suitable salts include lithium, sodium, and potassium. Anions of suitable salts include hydroxide, carbonate, nitrite, and nitrate. Some embodiments comprise a combination of salts, for example, a mixture at or near a eutectic. Some embodiments comprise a mixture of sodium carbonate and sodium hydroxide.

Embodiments of the gasification unit 130 are scalable, capable of gasifying a varying batch sizes and/or feed rates of the mixture 112. For example, some embodiments of the gasification unit 130 are throttleable from at least one lower output mode up to a maximum throughput mode. Some embodiments of the gasification unit 130 have a maximum throughput of at least about 450 kG/hr (about 1000 pounds per hour), while producing a quantity of syngas sufficient to run a 500 kW generator.

In the illustrated embodiment, the syngas 122 fuels the system generator 140, which provides at least a portion of the power for operating the abatement system 100. In some of these embodiments, the syngas 122 provides substantially all of the fuel for the system generator 140, thereby obviating the need for a supplemental fuel for the generator 140, for example, diesel, gasoline, kerosene, natural gas, or the like. Because syngas burns very cleanly and efficiently, some of these embodiments generate substantially no emissions other than carbon dioxide and water vapor. In some embodiments, at least a portion of the syngas 122 is used for a different purpose. For example, in some embodiments, the syngas is a fuel, for example, for a boiler, gas turbine, and/or fuel cell. In some embodiments, the syngas is a raw material, for example in the production of higher value commercial products such as transportation fuels, chemicals, hydrogen, and/or fertilizers.

In some embodiments, the ash 124 is substantially non-hazardous and/or non-toxic, and consequently, is dischargeable or disposable with few or no limits under applicable law. The ash 124 typically comprises an inorganic material including, for example, salts, minerals, and/or glass, with the precise composition depending on the composition of the carbon-containing waste 102 and carbon-based material 104. Some embodiments of the ash 124 are usable as aggregate, for example, in manufacturing and/or construction. In some embodiments, the aggregate is used in the manufacture of cement with improved flexibility, to produce roofing shingles, as asphalt filler, and/or as a sandblasting agent. In some embodiments, the ash 124 is a vitreous material that substantially resists leaching out of any constituent therefrom, thereby rendering the ash 124 substantially non-hazardous and/or non-toxic. In some of these embodiments, the ash 124 resembles volcanic ash, comprising silica and/or alumina.

Some embodiments of the gasification unit 130 further comprise a filter unit that removes contaminants from the syngas 122, thereby preventing or reducing their discharge into the environment. Some embodiments comprise a filter unit incorporated in the system generator 140 and/or as a freestanding unit. In particular, the discharge of certain contaminants is strictly regulated in some countries and regions. In some embodiments, the filter unit removes at least a fraction of any heavy-metal contaminant, for example, mercury, from the effluent generated by the gasification unit 130. Some embodiments of the filter unit comprise at least one of a filter that removes particulates, a sorbent that physically absorbs the contaminant, a reactant that chemically binds the contaminant, or a catalytic converter that transforms the contaminant into a more benign form. Some embodiments of the filter unit remove substantially all contaminants from the syngas 122. Some embodiments of the filter unit comprise, for example, at least one of a bag house, vortex filter, HEPA filter, or a catalytic scrubber.

The system generator 140 comprises any suitable electrical generator, for example, a gas turbine, internal-combustion-engine-powered generator, external-combustion-engine-powered generator, and/or a fuel cell. Some embodiments of the system generator 140 run substantially only on the syngas 122 generated by the gasification unit 130. Some embodiments of the system generator 140 run on hydrogen produced from the syngas 122. In some embodiments, the system generator 140 is capable of running on syngas 122 and another fuel, for example, diesel, kerosene, gasoline, hydrogen, and/or natural gas, which is useful, for example, when the abatement system 100 is not generating sufficient syngas 122. Some embodiments of the system generator 140 comprise a first generator that is fueled solely by the syngas 122 and a second generator that runs on another fuel. In some embodiments, the system generator 140 produces at least sufficient energy to power the abatement system 100. In some embodiments, the system generator 140 generates excess electrical power that is transmitted elsewhere. Some embodiments of the abatement system 100 also generate other utilities, for example, at least one of heat, steam, hot water, pressurized hydraulic fluid, compressed air, or vacuum. In some of these embodiments, the abatement system 100 is electrically coupled to a power grid, and is capable of exporting the excess power to the grid as well as drawing power therefrom if needed. Examples of suitable generators are available, for example, from Caterpillar (Peoria, Ill.) or Cummins (Minneapolis Minn.).

Figure 2:
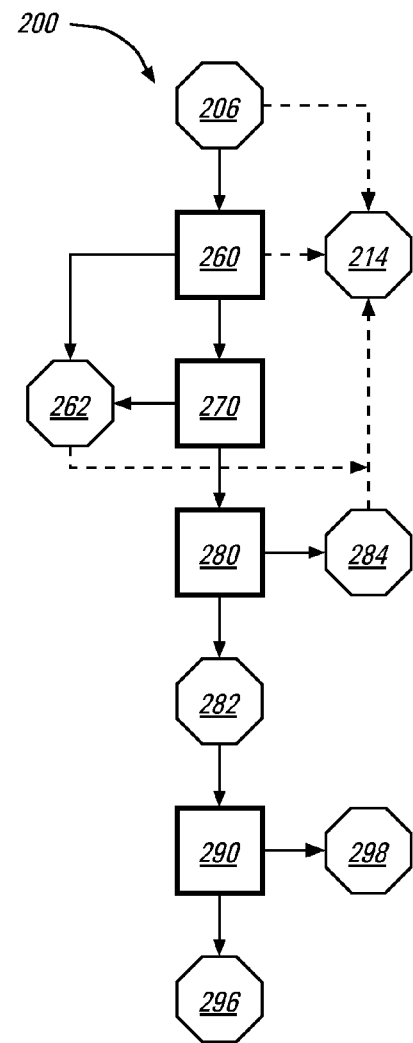
FIG. 2 schematically illustrates an embodiment of a aqueous waste abatement system.

FIG. 2 schematically illustrates an embodiment of a aqueous waste remediation or abatement system 200, which is suitable for treating wastewater created in drilling oil, gas, or water wells; flowback water from hydraulic fracturing in oil and gas production; industrial wastes; and/or wastewater not suitable for discharge without treatment. Examples include wastewater produced in hazardous waste clean-up and wastewater from oil and/or petroleum clean-up, for example, wastewater from oil boom cleaning and wastewater from fuel tank cleaning. Some embodiments of the aqueous waste 206 comprise hydrocarbon and/or organic contaminants. Some embodiments of the aqueous waste 206 comprise inorganic compounds, for example, salts and/or minerals. Some embodiments of the aqueous waste remediation system 200 produce remediated water that is at least one of potable, usable as industrial water, and/or dischargeable under applicable laws and regulations. In some embodiments, the water produced by the system is used as boiler water in an electrical generator; is suitable for use as or as a component of a drilling fluid for drilling water, oil, and/or natural gas wells; and/or is suitable as a hydraulic fracturing fluid in oil and/or natural gas production.

The aqueous waste remediation system 200 comprises an electrocoagulation unit 260 fluidly coupled to an optional flocculation unit or storage unit 270, fluidly coupled to a physical separation unit 280, fluidly coupled to a purification unit 290. As indicated by dotted lines in FIG. 2, the illustrated embodiment is equipped to collect volatile organic compounds from any combination of the aqueous waste 206, the electrocoagulation unit 260, collected floc 262, storage unit 270, separation unit 280, and heavy fraction 284 as described above. Some embodiments of the remediation system 200 are capable of treating aqueous waste in real time. Other embodiments are capable of treating aqueous waste in batches. Other embodiments are capable of treating aqueous waste in real time or in batches.

In an embodiment of a method for treating aqueous waste using the remediation system 200 illustrated in FIG. 2, aqueous waste 206 directed through an inlet into the electrocoagulation unit 260, which generates a flocculent or floc and a liquid phase. The contents are optionally transferred into a temporary storage unit or coagulation unit 270 in which the floc continues to form and matures. The mixture is transferred into the physical separation unit 280, which separates the mixture into a light fraction 282 and a heavy fraction 284. The light fraction 282 is treated in the purification unit 290 to provide remediated water 296.

In some embodiments, the electrocoagulation unit 260 comprises a cell in which the aqueous waste 206 is disposed between a pair of sacrificial plates. A DC potential is applied to the sacrificial plates, thereby flocculating or precipitating impurities 262 and/or contaminants from the aqueous waste 206. In some embodiments, the floc or precipitate 262 comprises heavy metals, colloidal particles, suspended solids, and/or broken organic emulsions. Commercially suitable electrocoagulation units 260 include SUR-FLO™ reactors (Kaselco, Shiner, Tex.); ELECTROPULSE™ system (Oil-Trap, Tumwater, Wash.); electrocoagulation systems by Powell Water Systems Inc. (Centennial, Colo.); electrocoagulation systems by Natural Systems (www.n-systems.net); and electrocoagulation systems by EcoDwell International, LLC (Kingman, Ariz.).

In some embodiments, the electrocoagulation unit 260 processes the aqueous waste 206 in real time. In some embodiments, the aqueous waste 206 residence time within the electrocoagulation unit 260 is within a range of from about 2 seconds to about 30 minutes, including from about 2 seconds to about 25 minutes, including from about 2 seconds to about 20 minutes, including from about 2 seconds to about 15 minutes, including from about 2 seconds to about 10 minutes, including from about 2 seconds to about 8 minutes, including from about 2 seconds to about 6 minutes, including from about 2 seconds to about 5 minutes, including from about 2 seconds to about 4 minutes, including from about 2 seconds to about 3 minutes, including from about 2 seconds to about 2 minutes, including from about 2 seconds to about 1 minute, including from about 2 seconds to about 30 seconds, including from about 2 seconds to about 15 seconds. In some embodiments, the aqueous waste 206 residence time within the electrocoagulation unit 260 permits real-time processing. In some embodiments, the aqueous waste 206 residence time within the electrocoagulation unit 260 permits formation of floc 262 and real-time remediation of aqueous waste 206.

In some embodiments, a pH of the aqueous waste 206 is adjusted to improve the electrocoagulation process. In some embodiments, the pH is adjusted before the aqueous waste 206 is disposed in the electrocoagulation unit 260, within the electrocoagulation unit 260, and/or after exiting the electrocoagulation unit 260, for example, in the storage unit 270. In some embodiments, the pH is adjusted at several points in the process, for example, where a first pH is advantageous in a first step and a second pH is advantageous in a second step. Some embodiments comprise an inline pH adjustment device for the aqueous waste 206 entering the electrocoagulation unit 260. In some embodiments, the pH is adjusted to from about 6.5 to about 8.5.

In some embodiments, the aqueous waste 206 in the electrocoagulation unit 260 and/or storage unit 270 is mixed with a flocculating agent or coagulant. Suitable flocculants include alum, clays, lime, and polymer flocculating agents, either alone or in combination. Suitable polymer flocculating agents include cationic, anionic, and/or non-ionic polymers with high, medium, and/or low molecular weights. Selection of a particular flocculating agent or agents depends on the impurities or contaminants in the aqueous waste 206.

In some embodiments, a temperature of the electrocoagulation unit 260 and/or storage unit 270 is selected that improves floc formation. The selected temperature depends on factors including type and concentration of contaminant; presence of other contaminants; characteristics of the electrocoagulation unit 260, pH, and the like. In some embodiments, the electrocoagulation unit 260 and/or storage unit 270 is sparged with a gas to increase the likelihood of generating floating floc 262 and/or to aggregate suspended floc 262. The sparge gas or gases are selected depending on factors including cost, availability, safety, reactivity with the floc, and the like. Suitable sparge gases include at least one of air, nitrogen, or oxygen. In some embodiments, sparging the electrocoagulation unit 260 removes and/or dilutes any hydrogen gas generated therein, improving safety.

In the storage unit 270, the electrocoagulated aqueous waste 206 matures, the flocs 262 coagulating into larger aggregates. Some embodiments of the remediation system 200 do not comprise a storage unit. Some embodiments comprise a plurality of storage units 270, for example, in which one or more parameters are independently adjustable in each to improve flocculation. Examples of suitable adjustable parameters include at least one of pH, temperature, presence of flocculating agent, sparging with gas, agitation, or the like.

In some embodiments, residence time of the electrocoagulated aqueous waste 206 in the storage unit 270 allows flocculent maturation or formation in a real-time remediation process. In some embodiments, the residence time in the storage unit 270 is selected according to characteristics of a downstream physical separation unit 280 such as but not limited to the physical separation unit 280 particulate cut-off size, on characteristics of a downstream purification unit 290, on characteristics of an upstream electrocoagulation unit 260, or on other water waste stream abatement system 200 characteristics, or on any combination thereof.

In some embodiments, residence time of a water waste stream within a temporary storage or coagulation unit 270 within a range of from about 1 second to about 4 hours, including from about 1 second to about 3.5 hours, including from about 1 second to about 3 hours, including from about 1 second to about 2.5 hours, including from about 1 second to about 2 hours, including from about 1 second to about 1.5 hours, including from about 1 second to about 1 hour, including from about 1 second to about 45 minutes, including from about 1 second to about 30 minutes, including from about 1 second to about 20 minutes, including from about 1 second to about 15 minutes, including from about 1 second to about 10 minutes, including about 9 minutes, about 8 minutes, about 7 minutes, about 6 minutes, about 5 minutes, about 4 minutes, about 3 minutes, about 2 minutes, about 1 minute, about 30 seconds, about 15 seconds, about 10 seconds, about 5 seconds, about 2 seconds, including ranges bordered and including the foregoing values.

In some embodiments, the floc 262 precipitates as a sediment and/or floats to the surface of the liquid phase in the electrocoagulation unit 260, in the storage unit 270, or in both. The buoyancy characteristics of the floc 262 depends on factors including the composition of the aqueous waste 206, the characteristics of the electrocoagulation unit 260, the pH, the temperature, the concentration of the impurities, the presence or absence of a flocculant, the presence of gas bubbles, and the like. In some embodiments, gas bubbles, for example, hydrogen and oxygen generated at the sacrificial electrodes of the electrocoagulation unit 260, mix with the floc 262 creating floating rafts. In some embodiments, the gas generated in the electrocoagulation unit 260 is removed or vented for safety. In some embodiments, the vented gas is used to generate power, for example, as a fuel, or fuel and oxidant for a generator. Some embodiments of the electrocoagulation unit 260, the storage unit 270, or both are equipped for dissolved air floatation, a process in which water saturated with air at above atmospheric pressure is added to the aqueous waste 206, thereby removing impurities from the aqueous waste 206 into floating rafts. Without being bound by any theory, it is believed that tiny air bubbles adhere to impurities 262 suspended in the aqueous waste 206, causing the impurities 262 to float to the surface.

In some embodiments, the floc is mechanically removed and collected from the electrocoagulation unit 260 and/or the storage unit 270. For example, in some embodiments, sedimented floc 262 is drained from the bottom of the electrocoagulation unit 260 and/or the storage unit 270. Some embodiments of the electrocoagulation unit 260 and/or the storage unit 270 comprise a conical, pyramidal, and/or tapered bottom, which facilitates draining sedimented floc 262. In some embodiments, floating floc 262 is skimmed from the surface of the electrocoagulation unit 260 and/or the storage unit 270. In some embodiments, the collected floc 262 is remediated, for example, in an abatement or remediation system disclosed herein, for example, as a carbon-containing waste feedstock in the system 100 illustrated in FIG. 1 and described above.

The electrocoagulated aqueous waste 206 is transferred from the electrocoagulation unit 260 or storage unit 270 into the physical separation unit 280, which separates the aqueous waste 206 into the light fraction 282 and the heavy fraction 284. Some embodiments of the heavy fraction 284 comprise heavier and/or more dense components remaining in the liquid phase, for example, at least one of unaggregated and/or uncoagulated floc generated by the electrocoagulation unit 260, larger suspended solids, high-density components, or the like. Some embodiments of the light fraction 282 comprise lighter and/or less dense components in the liquid phase, for example, at least one of organic compounds, smaller suspended solids, smaller unaggregated floc, low-density components, floc aggregates comprising gas bubble, or the like. Some embodiments of the separation unit 280 effect a three-way or even higher-order separation, providing more than two product fractions.

Embodiments of the physical separation unit 280 comprise any combination of liquid-liquid separators, liquid-solid separators, liquid-liquid-liquid separators, and liquid-liquid-solid separators. Some embodiments of the physical separation unit 280 separate from the liquid phase at least a fraction of a solid component, for example, particles, and/or an immiscible liquid component according to at least one of size, weight, or density. In some embodiments, the physical separation unit 280 separates from liquid phase substantially all solid components with at least one of a size, weight, or density greater than a selected value. For example, in some embodiments, the light fraction 282 comprises substantially no solid components with at least one a size, weight, or density greater than a selected value, and a heavy fraction 284 comprising substantially all of such solid components. In embodiments in which the liquid phase comprises an immiscible liquid organic component, the liquid organic component is partitioned according to density relative to the bulk liquid phase. Typically, the liquid organic component is less dense than the bulk liquid phase, and consequently, is partitioned into the light fraction 282. In some embodiments, however, at least a portion of the liquid organic component is denser than the liquid phase, for example, comprising halogenated organic compounds, and is partitioned into the heavy fraction 284.

In some embodiments, the light fraction 282 is substantially water with dissolved impurities. In some embodiments, the heavy fraction 284 comprises substantially all undissolved impurities and some water. Examples of undissolved impurities include solids, particles, floc, sediment, colloid particles, and organic compounds.

In some embodiments comprising an organic component less dense than the light fraction 282, the organic component is separated therefrom and is part of the heavy fraction 284. In some embodiments, the physical separation unit 280 comprises a liquid-liquid-liquid separator in which a first liquid output comprises material less dense than water, including the organic component. A second output stream is the light fraction. A third output stream is the heavy fraction 284. Some embodiments of the physical separation unit 280 comprise a liquid-liquid-solid separator with a first liquid output comprises material less dense than water, including an organic component. A second liquid output comprises the light fraction 282, and a solid output comprises the heavy fraction 284.

In some embodiment, a light fraction 282 comprising an organic component less dense than water is subjected to at least an additional physical separation stage or step, separating the light fraction 282 into a second light fraction that is substantially free of the organic component, and a fraction containing the organic component, which is combined with the heavy fraction 284.

Examples of suitable physical separation units 280 comprise, for example, at least one of a vortex separator, horizontal vortex separator, vertical vortex separator, hydrocyclone, centrifuge, or decanter centrifuge. Embodiments of the separation unit 280 comprising a decanter centrifuge are capable of process up to about 750 L/min (about 200 gal/min). Examples of suitable commercially available physical separation units include BAROID™ centrifuges (Halliburton, Houston, Tex.); DECAOIL® centrifuges (Hiller GmbH, Vilsbiburg, Germany); FLOTTWEG™ separators (Flottweg AG, Vilsbiburg, Germany); centrifuges available from CINC Industries, Inc. (Carson City, Nev.); AZ VorSpin™ Hydrocyclone (Compatible Components Corp., Houston, Tex.); and VORAXIAL® separators (Enviro Voraxial Technology, Inc, Fort Lauderdale, Fla.).

The heavy fraction 284 is optionally further process, as described in greater detail below. In the illustrated embodiment, volatile organic compounds 214 are collected from the aqueous waste 206, the electrocoagulation unit 260, the storage unit 270, the separation unit 280, and the floc or impurities 262, as indicated by the dotted lines. Some uses of the volatile organic compounds 214 are discussed above in conjunction with the system 100 illustrated in FIG. 1.

In the illustrated embodiment, the light fraction 282 is processed by the purification unit 290 to provide remediated water 296. Some embodiments of the purification unit 290 also produce a concentrate 298 in which impurities from the light fraction 282 are concentrated. In some embodiments, the concentrate 298 combined with the heavy fraction 284, or further treated as described below. In some embodiments, the selection of the type of purification unit 290 and/or purification method depends on a target use of the remediated water. Embodiments of the remediated water 296 are non-hazardous and non-toxic under applicable laws and regulations, and consequently are dischargeable or reusable without limitation. In some embodiments, the remediated water 296 is usable as at least one of potable water, industrial water, boiler water, agricultural water, process water, drilling fluid, drilling fluid base component, or the like. In some embodiments, the purification unit 290 also produces a concentrated waste, which is further remediated in a remediation or abatement system disclosed herein, for example, as a carbon-containing waste feedstock in the abatement system 100 illustrated in FIG. 1 and described above.

Some embodiments of the purification unit 290 comprise at least one of a filtration unit, charcoal or activated carbon filter, sand filter, diatomaceous earth filter, membrane filter, microfiltration unit, ultrafiltration unit, nanofiltration unit, reverse osmosis (RO) system, distillation system, vapor compression distillation unit, UV irradiator, gamma irradiator, sterilizer, chlorinator, ozone generator, electrodeionizer, ion exchanger, or the like. Some embodiments use a combination of purification technologies to provide remediated water 296 with the desired purity, for example, filtration and membrane filtration, or membrane filtration and distillation. Examples of suitable purification units and/or components thereof are commercially available from CNTC Inc. (Los Angeles, Calif.) (membrane filters); Siemens Water Technologies AG (Warrendale, Pa.) (membrane filters including VANTAGE™ reverse osmosis systems); FOREVERPURE™ (Santa Clara, Calif.) (including membrane filters and vapor compression distillers); and Sundragon Salt Factory (Delray Beach, Fla.) (vapor compression distillers).

Some embodiments of the purification unit 290 comprise at least one membrane filter. Membrane filtration technologies are classified according to the smallest particle size excluded by the membrane into microfiltration (about 0.1-10 μm), ultrafiltration (about $10^3$-$10^6$ Da), nanofiltration (about 200-1000 Da), and reverse osmosis (about 100 Da). Each membrane filtration unit generates a permeate or filtrate, which is a purified product stream, and a concentrate or reject, a product stream in which impurities in the feedstock are concentrated. Depending on the end use of the remediated water, embodiments of the purification unit 290 comprise one or more membrane filtration units. Some embodiments of the purification unit 290 comprise at least one hydrocarbon removal device upstream of the membrane filtration unit(s), for example, a charcoal or activated carbon filter.

Some embodiments employ permeate staging, in which the permeate of an upstream membrane filter is the feedstock of a downstream membrane filter, thereby reducing clogging in the downstream membrane filter and/or providing a cleaner permeate. For example, some embodiments comprise a microfiltration membrane upstream of a reverse osmosis membrane.

Some embodiments of the purification unit 290 employ concentrate staging, in which the concentrate of an upstream filter is the feedstock for a downstream filter. Embodiments comprising a cascading array of membrane filters in such a concentrate staging configuration convert a large percentage of the light fraction 282 into purified permeate, while generating a concentrate in which impurities are more concentrated.

Some embodiments comprise a plurality of membrane filtration units in parallel, thereby improving throughput. Some embodiments comprise another purification device upstream of the membrane filter, for example, at least one of a sediment filter or an activated carbon filter, which protects the membrane filter from larger particles and/or chlorine.

Some embodiments of the purification unit 290 comprise one or more vapor compression distillation units. Some embodiments of vapor compression distillation units produce about 60% purified distillate and about 40% residue or waste comprising concentrated impurities, for example, where the total dissolved solids (TDS) in the feedstock is about 130,000 mg/L. In some embodiments, the residue is itself subjected to a sequential vapor compression distillation, thereby increasing the total percentage of distillate to up to about 84%. Depending on the concentration of impurities in the feedstock, for example, the light fraction 282, the yield of the purified distillate is higher in some embodiments. For example, in some embodiments in which the feedstock has a lower total dissolved solids (TDS), the yield of purified distillate is higher, for example, greater than about 60%, greater than about 70%, or greater than about 80%. Some embodiments comprise additional serial or sequential purifications of the residue or waste. In some embodiments, the purification unit 290 comprises at least one hydrocarbon removal device upstream of the vapor compression distillation unit, for example, a charcoal or activated carbon filter.

Figure 3:
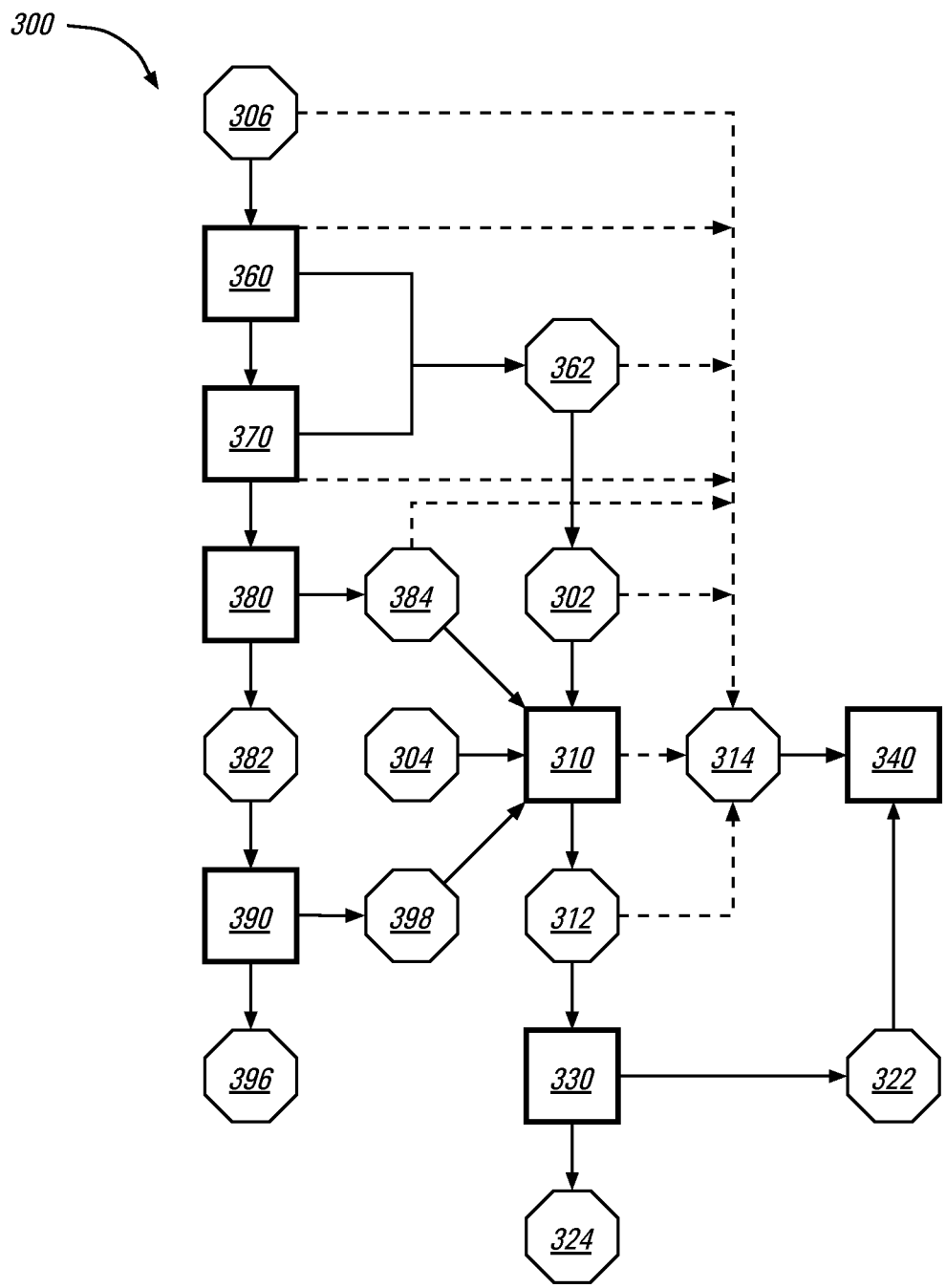
FIG. 3 schematically illustrates an embodiment of a waste abatement system comprising a carbon-containing waste stream abatement system in combination with an aqueous waste abatement system.

FIG. 3 schematically illustrates an embodiment of an integrated waste abatement, remediation, or treatment system 300 suitable for remediating or abating both aqueous waste 306 and carbon-containing waste 302. For example, in some embodiments, a waste stream comprises both an aqueous component and a non-aqueous component, for example, solids, sludge, organics, and/or foam. In some embodiments, the aqueous and non-aqueous components are separated, for example, by at least one of settling, skimming, decanting, or filtering to provide the aqueous waste 306 and the carbon-containing waste 302. In some embodiments, independent streams of carbon-containing 302 and aqueous 306 waste are generated concurrently. For example, in some embodiments, multiple wells are drilled on a single pad in which, a first well is undergoing hydraulic fracturing, thereby generating aqueous waste 306, at the same time that a second well is being drilled, thereby generating cuttings, a form of carbon-containing waste 302.

The components and operation of the system 300 are similar to the components and operation of the abatement system 100 and remediation system 200 illustrated in FIGS. 1 and 2, respectively, and described above, and similar components and procedures are not described again here. Briefly, aqueous waste 306 is treated in an electrocoagulation unit 360, then enters a storage unit 370. Floc/impurities 362 is collected from either or both of the electrocoagulation unit 360 or the storage unit 370. The treated waste 306 is separated into a light fraction 382 and a heavy fraction 384. A purification unit 390 converts the light fraction 382 is converted into remediated water 396. Carbon-containing waste 302, collected floc 362, and the heavy fraction 384 are mixed with a carbon-based material 304 in a mixer unit 310 to provide a mixture 312, which is fed into a gasification unit 330 to provide ash 324 and syngas 322. The syngas 322 fuels a system generator 340. Optionally, volatile organic compounds 314 collected from at least one of the aqueous waste 306, electrocoagulation unit 360, storage unit 370, collected floc 362, heavy fraction 384, or carbon-containing waste 302 also fuel the system generator 340. In other embodiments, the system 300 comprises another combination of embodiments of a carbon-containing waste abatement system and/or an aqueous waste remediation system disclose herein.

A notable feature of the system 300 is that the heavy fraction 384 from the separation unit 380 is fed into the mixer unit 310 where it is combined with at least one of the carbon-based material 304 or the carbon-containing waste 302. The heavy fraction 384 is thereby rendered non-hazardous and non-toxic as described above. In some embodiments, one or both of floc 362 collected from the electrocoagulation unit 360 and/or storage unit 370, and residue, concentrate, sediment, precipitate, or other by-product 398 from the purification unit 390 is also fed into the mixer unit 310 and made non-hazardous and non-toxic.

In some embodiments, at least a portion of the remediated water 396 is used as boiler water in the system generator 340. In some embodiments, at least a portion of the remediated water 396 is used as a heat transfer fluid, for example, for a heating element in the mixer unit 310, for cooling the system generator 340, for cooling the gasification unit 330, and/or for cooling a distillation system in the purification unit 360.

In the illustrated embodiment, volatile organic compounds 314 are collected from the components of the system 300, as indicated by the dotted lines in FIG. 3, and used as fuel in the system generator. As discussed above, the volatile organic compounds 314 have another use in some embodiments.

Figure 4:
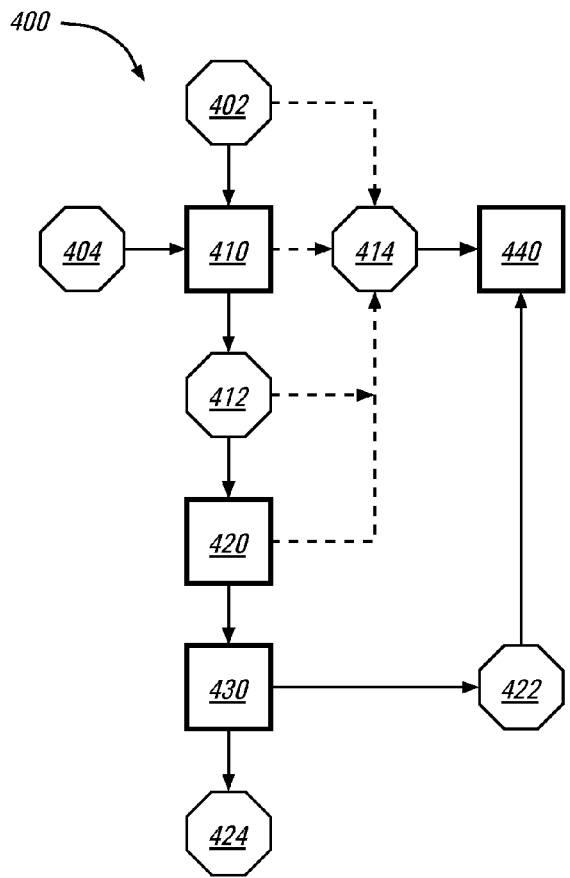
FIG. 4 schematically illustrates another embodiment of a carbon-containing waste abatement system.

FIG. 4 schematically illustrates another embodiment of a carbon-containing waste abatement system 400, which is generally similar to the system 100 illustrated in FIG. 1 and described above. The system 400 comprises carbon-containing waste 402, carbon-based material 404, mixer unit 410, mixture 412, gasification unit 430, syngas 422, system generator 440, and volatile organic compounds 414 that are substantially similar to the corresponding features described above with reference to the system 100 illustrated in FIG. 1. Consequently, only differences are described in detail here. Notably, the abatement system 400 further comprises a waste compactor, compressor, briquetter or pelletizer 420 disposed between and coupled to the mixer unit 410 and the gasification unit 412. The waste compactor 420 compresses the mixture 412 generated by the mixer unit 410 into briquettes, pellets, and/or another compacted and/or compressed form, which have a significantly reduced volume compared with the mixture 412. In some embodiments, the briquettes permit using a gasification unit 430 with a smaller volume, thereby reducing the abatement system 400 footprint and increasing the abatement system 400 portability. Because the briquettes take up less volume than the same weight of the uncompressed mixture 412, some embodiments of the gasification unit 430 comprise a relatively smaller combustion chamber, thereby reducing the volume of the gasification unit 430. Some embodiments of the briquettes are also easier to feed and/or to control feeding into the gasification unit 430 compared with the uncompressed mixture 412, which, in some embodiments, provides a more controlled gasification. In some embodiments, the briquettes are easier to store and transport, for example, where at least some of the gasification is performed at a remote location. Some embodiments of the waste compactor 420 comprises a dryer, which significantly reduces the moisture content of the briquettes relative to the mixture 412. Examples of suitable, commercially available waste compactors 420 include briquetters available from Biomass Briquette Systems, LLC (Chico, Calif.); Biomass Briquette Machine (AGICO Group, Henan, China); briquetting presses available from C. F. Nielsen A/S (Baelum, Denmark); briquetters available from Jay Khodiyar Machine Tools (Gujarat, India); AGNI™ Bio Mass Briquetting Presses (Agni Engg. & Industries, Erode, India); and WEIMA™ briquette presses (WEIMA America, Inc., Fort Mill, S.C.).

As indicated by the dotted line, in the illustrated embodiment, volatile organic compounds 414 released in the compactor 420 are optionally collected and used as discussed above.

Figure 5:
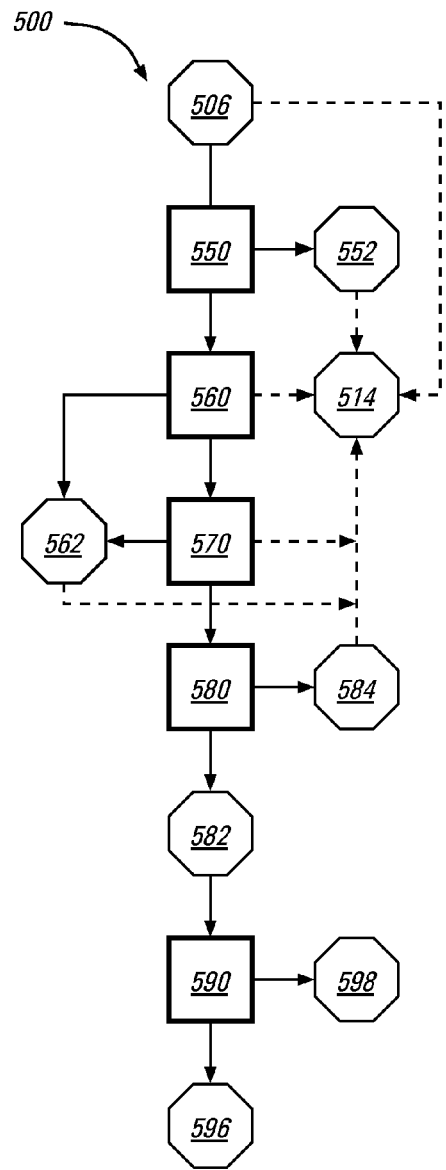
FIG. 5 schematically illustrates another embodiment of an aqueous waste abatement system.

FIG. 5 illustrates another embodiment of a aqueous waste remediation system 500 that is substantially similar to the embodiment illustrated in FIG. 2 and described above. Consequently, only the differences are discussed in detail here. Briefly, the system 500 comprises a screening unit 550, which separates screened solids 552 from the aqueous waste stream 506. The screened aqueous waste 506 enters an electrocoagulation unit 560 and a storage unit 570, which separate floc 562 from the aqueous waste 506. A physical separation unit 580 separates the waste 506 into a light fraction 582 and a heavy fraction 584. The light fraction 582 is treated in a purification unit 590 to provide remediated water 596, and in some embodiments, a concentrate 598. A notable difference is that the remediation system 500 further comprises the screening unit 550 disposed upstream of and fluidly coupled to the electrocoagulation unit 560.

In some embodiments, aqueous waste 506 is fed into the screening unit 550 where sand, gravel, sediment, aggregate, particles, and/or solids above a selected size are removed therefrom, producing screened solids 552. The remainder of the aqueous waste enters the electrocoagulation unit 560. In some embodiments, the screened solids 552 comprise contaminants, for example, hazardous solids in admixture therewith; and/or organics, for example, oil, adhered thereto, and are not disposable under applicable law. Consequently, in the illustrated embodiment, the screened solids 552 are further remediated, for example, in an abatement or remediation system disclosed herein, for example, as a carbon-containing waste feedstock for the system 100 illustrated in FIG. 1 and described above. In some embodiments, volatile organic compounds 514 released by the screened solids 552 are optionally collected and used as discussed above.

Some embodiment of the screening unit 550 remove particles with a diameter larger than about 0.2 mm, about 0.3 mm, about 0.4 mm, about 0.5 mm, about 0.6 mm, about 0.7 mm, about 0.8 mm, about 0.9 mm, about 1 mm, about 1.5 mm, about 2 mm, about 3 mm, about 4 mm, or about 5 mm. In some embodiments, the screening unit 550 remove particles with a diameter larger than about 70 mesh, about 45 mesh, about 40 mesh, about 35 mesh, about 30 mesh, about 25 mesh, about 20 mesh, about 18 mesh, about 14 mesh, about 10 mesh, about 7 mesh, about 5 mesh, or about 4 mesh. In some embodiments, the screening unit 550 comprises a plurality of sequential screens with a screen admitting larger particles upstream of a screen admitting smaller particles. In some embodiments, the size of particulates removed by the screening unit 550 is selected to reduce damage to or to increase the efficiency of the electrocoagulation unit 560. Screening units are optionally added to any embodiment including an aqueous waste treatment system or subsystem disclosed herein.

The screened aqueous waste 506 is treated in the electrocoagulation unit 550 and storage unit 560 from which floc 562 is separated and collected. The partially treated waste 506 is separated into a heavy fraction 584 and a light fraction 582, which is converted into remediated water 596 by a purification unit 590.

Figure 6:
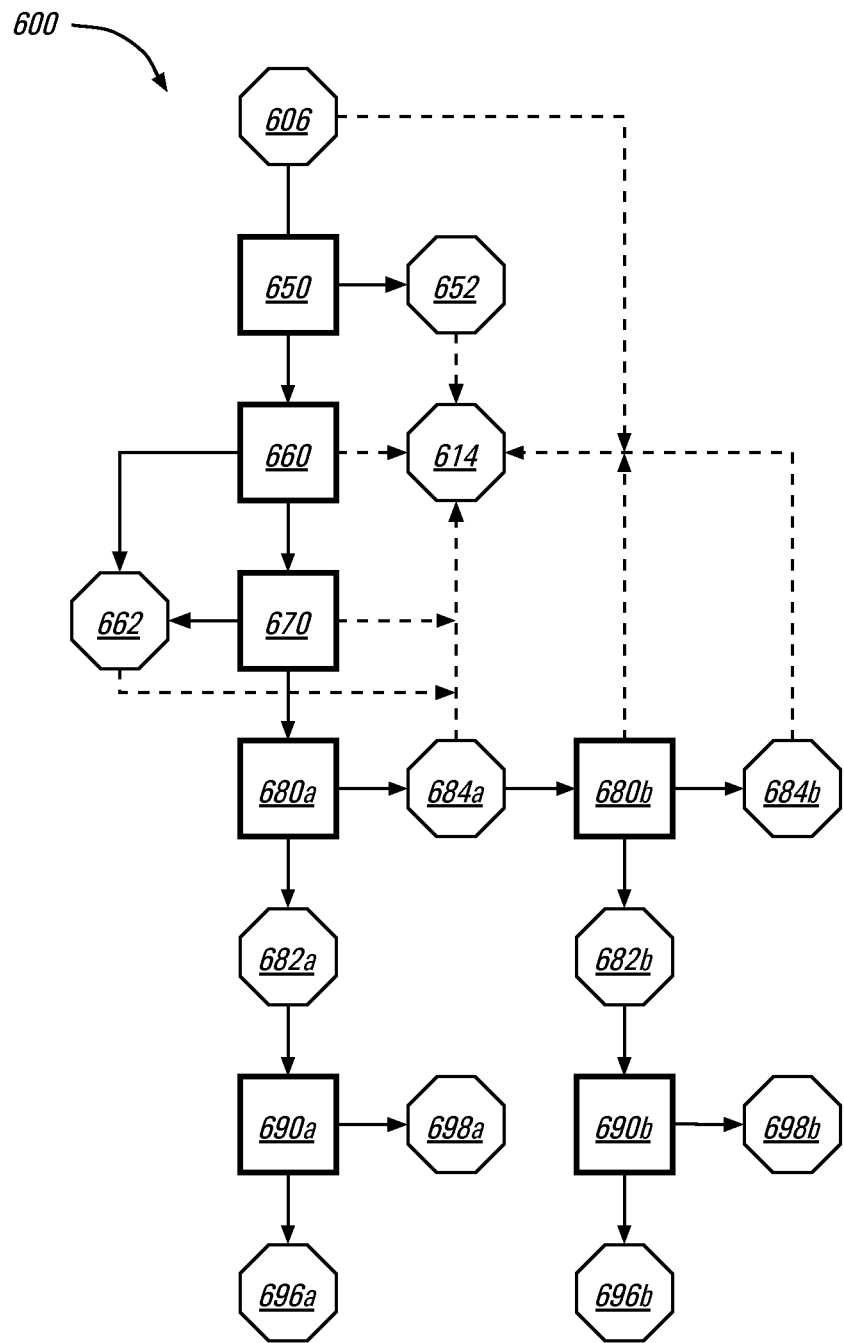
FIG. 6 schematically illustrates another embodiment of an aqueous waste abatement system.

FIG. 6 schematically illustrates another embodiment of an aqueous waste remediation system 600 that is generally similar to the embodiment illustrated in FIGS. 2 and 5, and described above. Consequently, only differences are discussed in detail here. Briefly, a screening unit 650 separates screened solids 652 from an aqueous waste stream 606. The screened aqueous waste 606 is treated in an electrocoagulation unit 660 and a storage unit 670, separating floc 662 from the aqueous waste 606. The illustrated embodiment of the system 600 further comprises a first physical separation unit 680a corresponding to the physical separation unit 280 of the system of system 200; a second physical separation unit 680b fluidly coupled to the first separation unit 680a; a first purification unit 690a fluidly coupled to the first separation unit 680a, which corresponds to the purification unit 290 of system 200; and a second purification unit 690b fluidly coupled to the second separation unit 680b. In the illustrated embodiment, the treated aqueous waste stream 606 enters the first separation unit 680a, which outputs a first light fraction 682a and a first heavy fraction 684a. The first light fraction 682a is treated by the first purification unit 690a, as discussed above, generating remediated water 696a, and in some embodiments, a concentrate 698a. In the illustrated embodiment, the first heavy fraction 684a is a feedstock for the second physical separation unit 680b, which is generally similar to the physical separation unit 280 of system 200. The second physical separation unit 680b converts the first heavy fraction 684a into a second light fraction 682b and a second heavy fraction 684b. The second light fraction 682b is treated by the second purification unit 690b, as discussed above, to provide remediated water 696b, and in some embodiments, a concentrate 698b. Other embodiments comprise only the first purification unit 690a, and the second light fraction 682b is combined with the first light fraction 682a and purified therein. Consequently, the illustrated embodiment improves the yield of remediated water from a given quantity of aqueous waste compared with the systems illustrated in FIGS. 2 and 5. In some embodiments, the second heavy fraction 684b is a feedstock in any of the embodiments of a carbon-containing waste abatement systems disclosed herein. In the illustrated embodiment, volatile organic compounds 614 are collected from any combination of the aqueous waste 606, screened solids 652, electrocoagulation unit 660, storage unit 670, floc 662, first heavy fraction 684a, and second heavy fraction 684b. Some embodiments further comprise one or more additional physical separation units fed by the heavy fraction generated by an upstream physical separation unit. Other embodiments of remediation systems described herein are also optionally equipped with multiple physical separation units and purification units.

Figure 7:
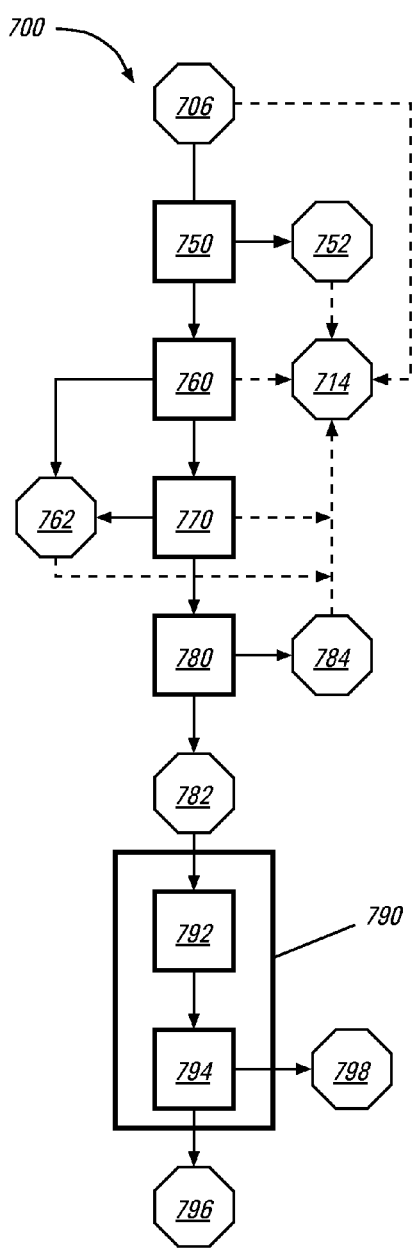
FIG. 7 schematically illustrates another embodiment of an aqueous waste abatement system.

FIG. 7 schematically illustrates another embodiment of an aqueous waste remediation system 700, which is generally similar to the system 200 illustrated in FIG. 2 and described above. Briefly, a screening unit 750 separates screened solids 752 from aqueous waste 706. Floc 762 is separated from the screened waste 706 using an electrocoagulation unit 760 and storage unit 770, as discussed above. A physical separation unit 780 separates the treated waste 706 into a light fraction 782 and a heavy fraction 784. A purification unit 790 produces remediated water 796 from the light fraction 782, and in some embodiments, a concentrate 798. Volatile organic compounds 714 are collected from any combination of the aqueous waste 706, screened solids 752, electrocoagulation unit 760, storage unit 770, floc 762, and heavy fraction 784. Consequently, only differences between the systems are discussed in detail here. In particular, the remediation system 700 is a particular embodiment of the remediation system 200 in which the purification unit 790 comprises a microfiltration unit 792 in series with a reverse osmosis (RO) unit 794.

In some embodiments, the microfiltration unit 792 removes particles with a diameter larger than about 0.1 µm, about 0.2 µm, about 0.3 µm, about 0.4 µm, about 0.5 µm, about 0.6 µm, about 0.7 µm, about 0.8 µm, about 0.9 µm, or about 1.0 µm. In some embodiments, the particle exclusion size or diameter is selected to improve the performance of the downstream RO unit 794.

Some embodiments of the abatement and remediation systems disclosed herein are automated, comprising, for example, at least one control unit. Examples of suitable control units comprise, for example, at least one computer, microprocessor, embedded controller, application specific integrated circuit (ASIC), and the like, as well as a machine-readable storage medium, and machine readable instructions stored thereon. Some embodiments further comprise one or more sensors operatively coupled to one or more of the components of the abatement or remediation systems, the sensors suitable for measuring or detecting one or more of the operating parameters discussed in greater detail below, for example, throughput, temperature, pressure, pH, conductivity, turbidity, viscosity, color, gas composition, flow rate, power output, and the like. The control unit adjusts the operation of one or more components of the system according to the data collected by the one or more sensors, thereby improving at least one aspect of the operation thereof, for example, throughput, efficiency, energy output, and/or regulatory compliance.

In some embodiments, the abatement or remediation systems disclosed herein are operable to treat waste in a continuous process. In some embodiments, the system operates in batch mode. Some embodiments of the abatement or remediation system are operable either continuously or in batch mode as desired. For example, in some embodiments, a batch process is more appropriate where the waste is produced intermittently and/or in small amounts.

Some embodiments of the abatement or remediation systems disclosed herein comprise a plurality of at least one of the components. For example, in the embodiment illustrated in FIG. 1, some embodiments comprise a plurality of at least one of the mixer unit 110, the gasification unit 130, or the system generator 140, which permits the system 100 to, for example, treat greater volumes of waste 102, treat different types of waste 102, and/or continuously operation during reconfiguration, maintenance, and/or repair.

In some embodiments, one or more of the components of the abatement or remediation systems disclosed herein, are modularized. Embodiments of modularized systems improve, for example, transportability, speed of assembly, and/or configurability. For example, some embodiments of the systems disclosed herein comprise five or fewer modules, or three or fewer modules sized as standard transportation units, discussed in greater detail below. Some embodiments are assemblable into a working system in about 24 hours or less. In some embodiments, modules are added, removed, or replaced as the amount of waste increases, amount of waste decreases, or the type of waste changes.

In some embodiments, a single module comprises every component of the abatement or remediation system. In other embodiments, the abatement or remediation system comprises a plurality of modules. For example, in the embodiment illustrated in FIG. 1, at least one of the mixer unit 110, the gasification unit 130, or the system generator 140 is modularized, permitting the assembly of an abatement system 100 according to the requirements of a particular application. In some embodiments, modules are optimized for different environmental conditions, for example, temperature and/or precipitation; type of waste; type of carbon-based material 104; volume of waste; availability of utilities, for example, electricity, and/or water; and/or regulatory requirements. In some embodiments, a module comprises one or more of the components of the abatement or remediation system mounted on a single platform or carrier. Some embodiments of the module comprises a plurality of a single type of component mounted to the single platform or carrier, as discussed above, for example, a plurality of mixer units 110, gasification units 130, and/or generators 140.

In some embodiments, the platform or carrier is a standard transportation unit, for example, a semi trailer or an intermodal shipping container. For example, single trailers in North America are typically about 2.6 m (about 8.5 ft) wide, and about 14.6 m (about 48 ft) or about 16.2 m (about 53 ft)

long. In Europe, single trailers are typically about 16.5 m or about 18.75 m long. Other standard sizes are used in other countries and/or regions. In some embodiments, the modules are suitable for transport in double or triple trailer configurations. Intermodal containers are typically from about 2.5 m (about 8 ft) to about 17 m (about 56 ft) long, about 2.4 m (about 8 ft) wide, and from about 2.6 m (about 8.5 ft) to about 2.9 m (about 9.5 ft) high.

An example of a particular application of a modularized system is the remediation of drilling waste generated by off-shore oil drilling. Portability and scalability of the modular systems permit treating the waste on-site rather than transporting the drilling waste for off-site remediation or disposal, thereby significantly reducing the cost. Modularizing components of the remediation or abatement system in intermodal containers facilitates transport to off-shore oil rigs, because intermodal containers are stackable, thereby saving space both on-site and in transit, as well as loadable and off-loadable using standard equipment and procedures. In some embodiments, the remediated water and/or ash end-products of the systems and processes disclosed herein are permissibly disposed of into the ocean, thereby avoiding the cost to transport waste for on-shore processing or disposal. Embodiments of the systems and processes also generate power, which is usable on the drilling rig. Moreover, in some cases, the nature of the drilling waste changes with depth of the well. Drilling fluids are typically aqueous early in the drilling process, changing to an oil-based mud at greater depths. Embodiments of the modularized systems permit modifying the remediation or abatement system to accommodate the changing nature of the waste.

EXAMPLE

Figure 8:
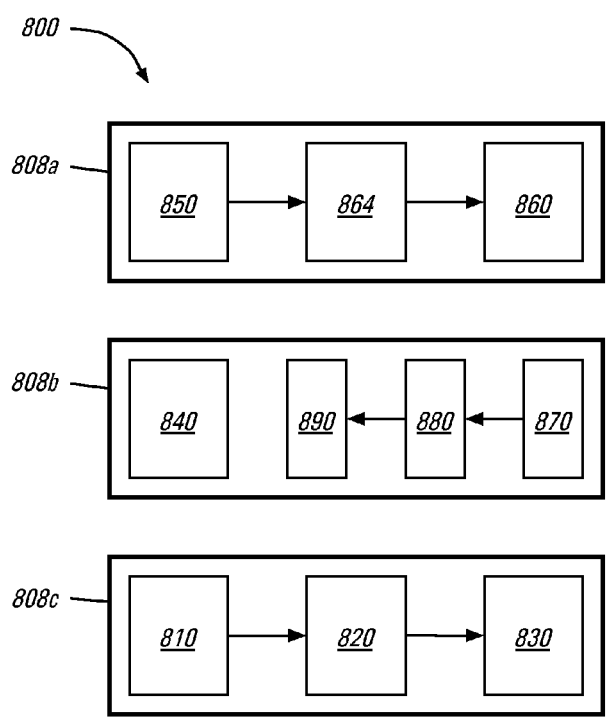
FIG. 8 is a schematic top view of an embodiment of a modularized waste abatement and remediation system.

FIG. 8 is a top view of an embodiment of a modularized system 800 for treating both aqueous waste and carbon-containing waste. As such, the system 800 is generally similar to the system 300 illustrated in FIG. 3 with elements of other embodiments, all of which are described above. As such, the components are generally coupled together and operated as described above. The components are disposed in a first trailer 808a, a second trailer 808b, and a third trailer 808c, each of which is a North American standard trailer, about 16.2 m (53 ft) long by about 2.6 m (8.5 ft) wide. The components within each trailer are prewired to standardized power and data quick-interconnects. The components in each trailer are pre-piped to each other as required. Fluid quick connects are supplied for fluid connections between trailers.

The first trailer 808a houses the first half of the components of the aqueous waste remediation portion of the system 800, including a pre-filter or screening unit 850, which removes particulates larger than about 890 µm (about 20 mesh); a pH and flocculating agent adjustment unit 864, which is an in-line unit that automatically adjusts the pH of the aqueous waste stream and optionally adds a flocculating agent thereto; and an electrocoagulation unit 860. The in-line pH adjustment unit and electrocoagulation unit are from OilTrap Environmental Products (Tumwater, Wash.) The electrical requirements of the pH and flocculating agent adjustment unit 864 and electrocoagulation unit 860 together are 240 V, 3 ph, 90 A, with a power consumption of about 43.2 KW/hr.

The second trailer 808b houses the remainder of the aqueous waste remediation portion of the system 800, including a storage or flocculation tank 870; a centrifuge 880, which is a Baroid decanter type centrifuge; and a vapor compression unit 890. The centrifuge 880 is selected for reliability, throughput, and availability, with process flow rates adjustable between from about 0 and about 750 L/min (about 200 gal/min). The centrifuge 880 consumes a total of about 60 hp or 45 KW/hr. The vapor compression unit 890 (FOREVER-PURE™, Santa Clara, Calif.) comprises a first vapor compression subunit processing the output of the centrifuge 880 and a second vapor compression subunit processing the discharge or residue from the first vapor compression subunit. The first subunit processes up to about 315 L/min (about 5000 gal/hr) with an average power draw of about 2.6 W/L (about 10 W/gal). Each vapor compression subunit runs about 40% discharge depending on the concentration of total dissolve solids (TDS) in the water. Assuming a 130,000 (TDS) for a 20,000 L output from the centrifuge 880: Subunit 1: 40% waste of 20,000 L @ 130,000 TDS=12,000 L of fresh water and a 8,000 L waste stream @ 325,000 TDS, with a total power consumption of about 50 KW/hr. Subunit 2: 40% waste of 8,000 L @ 325,000 TDS=4,800 L of fresh water and a 3,200 L waste stream @ 812,500 TDS, 20 KW/hr; for a total of 16,800 L of clean, fresh water and discharge of 3,200 L with a 812,500 TDS or 84% pure water and 16% discharge with original effluent water at 130,000 TDS, with a total power consumption for both subunits of about 70 KW/hr.

The second trailer 804 also houses a generator 840, which is a duel-fuel generator. The generator 840 comprises an internal combustion engine capable of running on diesel fuel and syngas, as available, with a minimum output of about 500 KW/hr. The ability to run on diesel permits operation of the system 800 before any syngas is generated, or in the alternative, operation of only the aqueous waste remediation portion of the system 800, if desired. In some embodiments, when only the aqueous waste remediation portion of the system 800 is used, third trailer is unnecessary. In some of these embodiments, by-products generated in the aqueous waste remediation portion of the system 800—for example, screened solids, collected floc, a heavy fraction from the centrifuge 880, and/or a concentrate from the vapor compression unit 890—are disposed of and/or further processed off-site. In some embodiments in which only aqueous waste is remediated, the third trailer 808c is used to remediate or abate at least some of these by-products.

The third trailer 808c houses components of the carbon-containing waste abatement portion of the system 800, including a mixer 810, which is a TENDER BLENDER® mixer (Scott Equipment, New Prague, Minn.) equipped with a heating element; a briquetter 820; and a gasifier 830, which is a POWERHEARTH™ gasifier (International Innovations Inc., Barre, Vt.). The mixer 810 consumes about 15 KW/hr. The briquetter 820 consumes about 5.6 KW/hr. The gasifier 830 is throttleable with a maximum throughput of about 7.5 Kg/min (about 1000 lb/hr) of a briquetted kenaf/waste mixture, which generates sufficient syngas to run the generator 840 at a 500 KW output continuously. The gasifier 830 consumes a maximum of 4 KW/hr.

The total power consumption of the system 800 is about 182.8 KW/hr, which is easily within the capacity of the generator 840. The mixer 810 will consume additional power if the heating element in the mixer 810 is used. Heating, air conditioning, and lighting the trailers 808a, 808b, and 808c will also draw additional power.

The above detailed description of certain embodiments is not intended to be exhaustive or to limit the claims to the precise form disclosed above. While specific embodiments and examples are described above for illustrative purposes, various equivalent modifications are possible within the scope of the disclosure, as those skilled in the relevant art will recognize. Each of these processes, systems, or devices is implementable in a variety of different ways.

While certain embodiments have been described, these embodiments have been presented by way of example only, and are not intended to limit the scope of the disclosure. Indeed, the novel methods, devices, and systems described herein may be embodied in a variety of other forms. Furthermore, various omissions, substitutions and changes in the form of the methods, devices, and systems described herein may be made without departing from the spirit of the disclosure. The accompanying claims and their equivalents are intended to cover such forms or modifications as would fall within the scope and spirit of the disclosure.

What is claimed is:

1. A method for remediating a carbon-containing aqueous waste, the method comprising:
   electrocoagulating the carbon-containing aqueous waste to provide floc and a liquid phase;
   removing the floc from the liquid phase;
   physically separating the liquid phase into a light fraction and a heavy fraction;
   converting at least a portion of the light fraction into water with a selected purity;
   mixing at least one of the floc and the heavy fraction with a carbon-based material to provide a mixture;
   gasifying the mixture to provide ash and syngas.

2. The method of claim 1, wherein converting at least a portion of the light fraction comprises at least one of microfiltration, reverse osmosis, distillation, or vapor compression distillation.

3. The method of claim 1, wherein mixing at least one of the floc and the heavy fraction with a carbon-based material to provide a mixture further comprises mixing a carbon-containing waste with the carbon-based material.

4. The method of claim 1, wherein mixing at least one of the floc and the heavy fraction with a carbon-based material comprises mixing at least one of the floc and the heavy fraction with at least one of kenaf, kenaf bast, or kenaf core.

5. The method of claim 1, wherein gasifying the mixture comprises at least one of thermal gasification, pyrolytic gasification, plasma gasification, plasma-enhanced gasification, or molten-salt gasification.

6. The method of claim 1, further comprising generating power from the syngas.

7. The method of claim 1, further comprising screening solids from the carbon-containing aqueous waste.

8. The method of claim 1, further comprising compacting the mixture into briquettes or pellets before gasifying the mixture.

9. A system for remediating an aqueous waste and a carbon-containing waste, the system comprising:
   a screening unit comprising a carbon-containing aqueous waste inlet, a screened solids outlet, and a liquid outlet;
   a pH adjustment unit comprising an inlet fluidly coupled to the liquid outlet of the screening unit, the pH and flocculating agent adjustment unit suitable for automatically adjusting a pH of an aqueous waste stream;
   an electrocoagulation unit comprising an inlet fluidly coupled to the outlet of the pH adjustment unit and an outlet;
   a storage unit comprising an inlet fluidly coupled to the outlet of the electrocoagulation unit and an outlet, the storage unit suitable for separating floc from an aqueous waste;
   a physical separation unit comprising an inlet fluidly coupled to the outlet of the electrocoagulation unit, the physical separation comprising a centrifuge capable of separating fluid into a heavy fraction and a light fraction, the physical separation unit comprising a heavy fraction outlet and a light fraction outlet;
   a purification unit comprising an inlet fluidly coupled to the light fraction outlet of the physical separation unit, the purification unit comprising at least one of a vapor compression distillation unit or a membrane filter, the purification unit capable of converting at least a portion of the light fraction into water of a selected purity;
   a mixer unit comprising at least one inlet and a mixture outlet, the at least one inlet fluidly coupled to the heavy fraction outlet of the physical separation unit, the at least one inlet coupled to a source of the carbon-containing waste, and the at least one inlet coupled to a source of at least one of kenaf, kenaf bast, or kenaf core, the mixer unit comprising a continuous mixer including a heater, wherein the continuous mixer is a paddle mixer, a ribbon mixer, or a combination paddle-ribbon mixer;
   a briquetter comprising an inlet coupled to the mixture outlet of the mixer unit and a briquette outlet, the briquetter capable of compressing the output of the mixer unit into briquettes;
   a gasification unit comprising an inlet coupled to the briquette outlet of the briquetter, the gasification unit further comprising a syngas outlet; and
   a generator comprising an inlet fluidly coupled to the syngas outlet of the gasification unit and an electrical outlet, the generator comprising an internal combustion engine capable of running on at least syngas.

10. A system for remediating a carbon-containing aqueous waste, the system comprising:
    an electrocoagulation unit comprising an aqueous waste inlet and an outlet;
    a physical separation unit comprising an inlet fluidly coupled to the outlet of the electrocoagulation unit, the physical separation unit capable of separating fluid into a heavy fraction and a light fraction based on at least one of size, weight, or density, the physical separation unit comprising a heavy fraction outlet and a light fraction outlet;
    a purification unit comprising an inlet fluidly coupled to the light fraction outlet of the physical separation unit, the purification unit capable of converting at least a portion of the light fraction into water of a selected purity;
    a mixer unit comprising a waste inlet, a carbon-based material inlet, and a mixture outlet, the waste inlet fluidly coupled to the heavy fraction outlet of the physical separation unit and the carbon-based material inlet coupled to a source of a carbon-based material; and
    a gasification unit comprising an inlet coupled to the mixture outlet of the mixer unit, the gasification unit further comprising a syngas outlet.

11. The system of claim 10, wherein the physical separation unit comprises at least one of a vortex separator, horizontal vortex separator, vertical vortex separator, hydrocyclone, centrifuge, or decanter centrifuge.

12. The system of claim 10, wherein the purification unit comprises a charcoal or activated carbon filter, and at least one of at least one membrane filter or at least one vapor compression unit.

13. The system of claim 10, wherein the mixer unit comprises at least one of a paddle mixer, ribbon mixture, paddle/ribbon mixer, plow mixer, screw mixer, V mixer, or high-shear mixer.

14. The system of claim 10, wherein the waste inlet of the mixer unit is coupled to a source of a carbon-containing waste.

15. The system of claim 10, wherein the gasification unit comprises at least one of a thermal gasifier, a pyrolytic gasifier, a plasma-enhanced gasifier, a plasma gasifier, or a molten-salt gasifier.

16. The system of claim 10, further comprising a screening unit upstream of the electrocoagulation unit, the screening unit comprising a waste inlet and a waste outlet, the waste outlet fluidly coupled to the aqueous waste inlet of the electrocoagulation unit, the screening unit capable of removing at least a portion of at least one of sand, gravel, sediment, aggregate, particles, or solids above a selected size.

17. The system of claim 10, further comprising a storage unit fluidly disposed between the electrocoagulation unit and the physical separation unit, the storage unit permitting floc formation from electrocoagulated liquid.

18. The system of claim 10, further comprising a compactor disposed between the mixer unit and the gasification unit, the compactor capable of compacting the mixture generated by the mixer unit.

19. The system of claim 10, further comprising a system generator comprising a fuel inlet fluidly coupled to the syngas outlet of the gasification unit, and an electrical power outlet electrically coupled to electrical power inlets on at least one of the electrocoagulation unit, the physical separation unit, the purification unit, the mixer unit, or the gasification unit.

20. The system of claim 10, wherein the electrocoagulation unit, the physical separation unit, the purification unit, the mixer unit, and the gasification unit are disposed in at least one intermodal shipping container or semi trailer.

* * * * *